(12) United States Patent
Isoda

(10) Patent No.: US 7,073,000 B2
(45) Date of Patent: Jul. 4, 2006

(54) COMMUNICATION SYSTEM AND COMMUNICATION CONTROL APPARATUS AND METHOD

(75) Inventor: Takashi Isoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 10/185,701

(22) Filed: Jun. 28, 2002

(65) Prior Publication Data

US 2003/0041195 A1 Feb. 27, 2003

Related U.S. Application Data

(63) Continuation of application No. PCT/JP01/09504, filed on Oct. 30, 2001.

(30) Foreign Application Priority Data

Oct. 31, 2000 (JP) ............................. 2000/332892

(51) Int. Cl.
*G06F 13/00* (2006.01)
(52) U.S. Cl. ............................ 710/104; 710/10; 710/15
(58) Field of Classification Search ................. 710/33, 710/20, 104, 10, 15, 105
See application file for complete search history.

(56) References Cited

U.S. PATENT DOCUMENTS

| | | | | |
|---|---|---|---|---|
| 5,809,331 | A * | 9/1998 | Staats et al. .................. 710/10 |
| 5,968,152 | A | 10/1999 | Staats .......................... 710/104 |
| 5,991,842 | A * | 11/1999 | Takayama ................... 710/105 |
| 6,003,065 | A * | 12/1999 | Yan et al. .................... 709/201 |
| 6,160,796 | A * | 12/2000 | Zou .............................. 370/257 |
| 6,182,094 | B1 * | 1/2001 | Humpleman et al. ........ 715/513 |
| 6,185,632 | B1 | 2/2001 | Berkema ..................... 710/20 |
| 6,198,479 | B1 * | 3/2001 | Humpleman et al. ........ 345/733 |
| 6,519,656 | B1 * | 2/2003 | Kondo et al. .................. 710/6 |
| 6,523,696 | B1 * | 2/2003 | Saito et al. .................. 709/223 |
| 6,667,992 | B1 * | 12/2003 | Yanagawa .................... 370/490 |
| 6,671,768 | B1 * | 12/2003 | Brown ........................ 711/102 |
| 6,725,311 | B1 * | 4/2004 | Joy et al. ..................... 710/305 |
| 6,760,804 | B1 * | 7/2004 | Hunt et al. .................. 710/313 |
| 6,775,244 | B1 * | 8/2004 | Hattig .......................... 370/257 |
| 6,788,882 | B1 * | 9/2004 | Geer et al. ................... 386/116 |
| 6,801,507 | B1 * | 10/2004 | Humpleman et al. ........ 370/257 |
| 6,813,663 | B1 | 11/2004 | Brown ........................ 710/104 |
| 2001/0021493 | A1 | 9/2001 | Sato ............................ 709/213 |
| 2001/0042142 | A1 * | 11/2001 | Fukunaga et al. ............ 710/11 |
| 2002/0078293 | A1 * | 6/2002 | Kou et al. .................... 710/305 |

(Continued)

FOREIGN PATENT DOCUMENTS

EP 0 279 232 1/1988

(Continued)

OTHER PUBLICATIONS

Paskins, A., "The IEEE 1394 Bus," May 12, 1997, IEEE Half-Day Colloquium on New High Capacity Digital Media and Their Applications (Digest No: 1997/114), p. 4/1-4/6.*

(Continued)

*Primary Examiner*—Glenn A. Auve
(74) *Attorney, Agent, or Firm*—Fitzpatrick, Cella, Harper & Scinto

(57) ABSTRACT

An initiator has logical devices (A, B, C). A target to obtain services from the initiator designates the ID of provided services and the directory ID indicating a directory where the information concerning a logical device is stored, and further the target issues a connection control request to the initiator. The initiator provides the designated logical device and services to the target via the established connection.

11 Claims, 31 Drawing Sheets

U.S. PATENT DOCUMENTS

| | | | |
|---|---|---|---|
| 2002/0152337 A1* | 10/2002 | Kondo et al. ................ | 710/33 |
| 2002/0194417 A1* | 12/2002 | Suzuki et al. ............... | 710/305 |
| 2003/0069979 A1* | 4/2003 | Horiguchi .................. | 709/227 |
| 2003/0158979 A1* | 8/2003 | Tateyama et al. ............ | 710/33 |
| 2003/0202539 A1* | 10/2003 | Fukunaga et al. .......... | 370/489 |
| 2003/0212850 A1* | 11/2003 | Nagasaka .................. | 710/305 |
| 2004/0148446 A1* | 7/2004 | Katsch ...................... | 710/104 |

FOREIGN PATENT DOCUMENTS

| | | |
|---|---|---|
| EP | 0 949 782 | 10/1999 |
| EP | 996069 A2 * | 4/2000 |
| EP | 1 056 021 | 11/2000 |
| EP | 1 071 255 | 1/2001 |
| JP | 5-044693 | 7/1993 |
| JP | 10-023097 | 1/1998 |
| JP | 11-154123 | 6/1999 |
| JP | 2000-151664 | 5/2000 |
| JP | 2000-253463 | 9/2000 |
| JP | 2001-86195 | 3/2001 |
| JP | 2001-148706 | 5/2001 |
| WO | WO00/01191 | 6/2000 |
| WO | WO01/08151 | 2/2001 |

OTHER PUBLICATIONS

Severance, C., "Linking Computers and Consumer Electronics," Feb. 1997, IEEE Computer, vol. 30, Issue 2, p. 119-121.*

Santamaria, Romualdo, "IEEE-1394: A Standard for the Next Millenium," Oct. 24-29, 1999, IEEE Digital Avionics Systems Conference, vol. 1, p. 1.C.2-1-1.C.2-7.*

Kovar, Joseph F., "Printers to Get FireWire Specification," Mar. 2, 2000, TechWeb, p. 1 <available at http://www.techweb.com/wire/story/TWB20000302S0008>.*

"IEEE 1394.3 Set for Final Balloting as Official Printer Standard," Mar. 1, 2000, Business Wire, p. 1-2 <available at http://www.findarticles.com>.*

"IEEE 1394.3 Peer-to-Peer Data Transport Technology to Enable New Printer, Imaging Devices using 1394 Multimedia Bus," Mar. 6, 2000, Business Wire, p. 1 <available at http://www.findarticles.com>.*

"IEEE Standard for High Performance Serial Bus," 1996, The Institute of Electrical and Electronics Engineers, Inc., IEEE Std 1394-1995, p. 227-234.*

"IEEE 1394.3 Peer-to-Peer Data Transport Technology to Enable New Printer, Imaging Devices using 1394 Multimedia Bus," Mar. 6, 2000, Business Wire (available at www.looksmart.com).*

"IEEE 1394.3 Set for Final Balloting as Official Printer Standard," Mar. 1, 2000, Business Wire (available at www.looksmart.com).*

Mitchell Shnier, Computer Dictionary, 1998, QUE Corporation, p. 177-178.*

LeClair, et al., "P1394.3 Draft Standard for a High Performance Serial Bus Peer-to-Peer Data Transport Protocol (PPDT)"; IEEE; Jul. 29, 2000, Draft 2.0.

Batchelder et al, "P1212 Draft Standard for a Control and Status Register (CSR) Architecture for microcomputer buses,", Institute of Electrical Engineers, Inc.; Draft 1.0; Oct. 18, 1999.

"Structure for Controlling Small Computer System Interface Logical Devices In An Independent And Overlapped Manner", IBM Technical Disclosure Bulletin, IBM, Corp., New York, US. vol. 33, No. 1A, pp. 330-332. Jun. 1, 1990.

"Automatic Target Mode For The Small Computer System Interface", IBM Technical Disclosure Bulletin, IBM, Corp., New York, U.S. vol. 33, No. 5, pp. 130-133. Oct. 1, 1990.

J. Howard, et al., "USB Feature Specification: Dynamic Logical-Device", USB Feature Specification: Dynamic Logical-Device, pp. 1-14, Oct. 27, 1999.

* cited by examiner

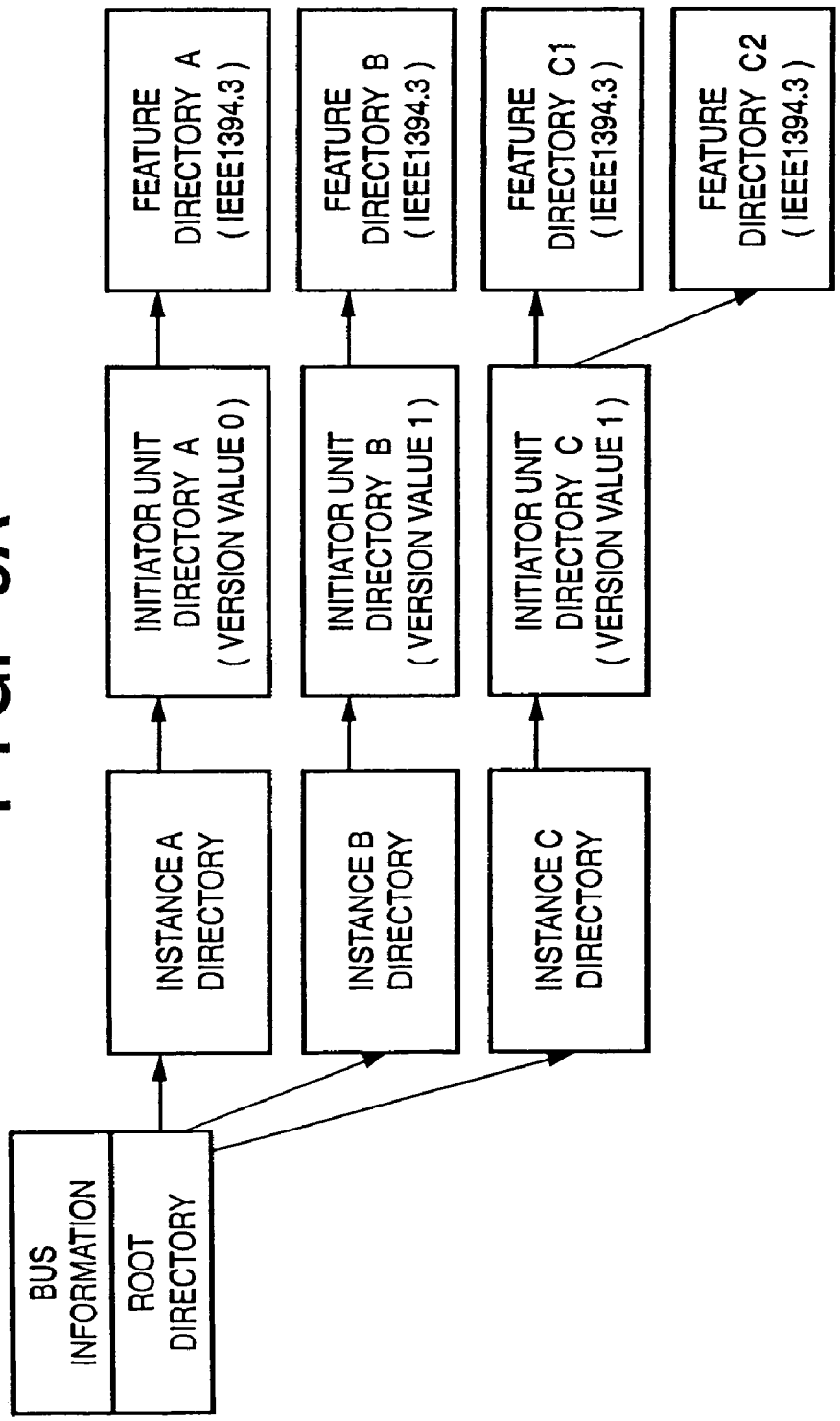

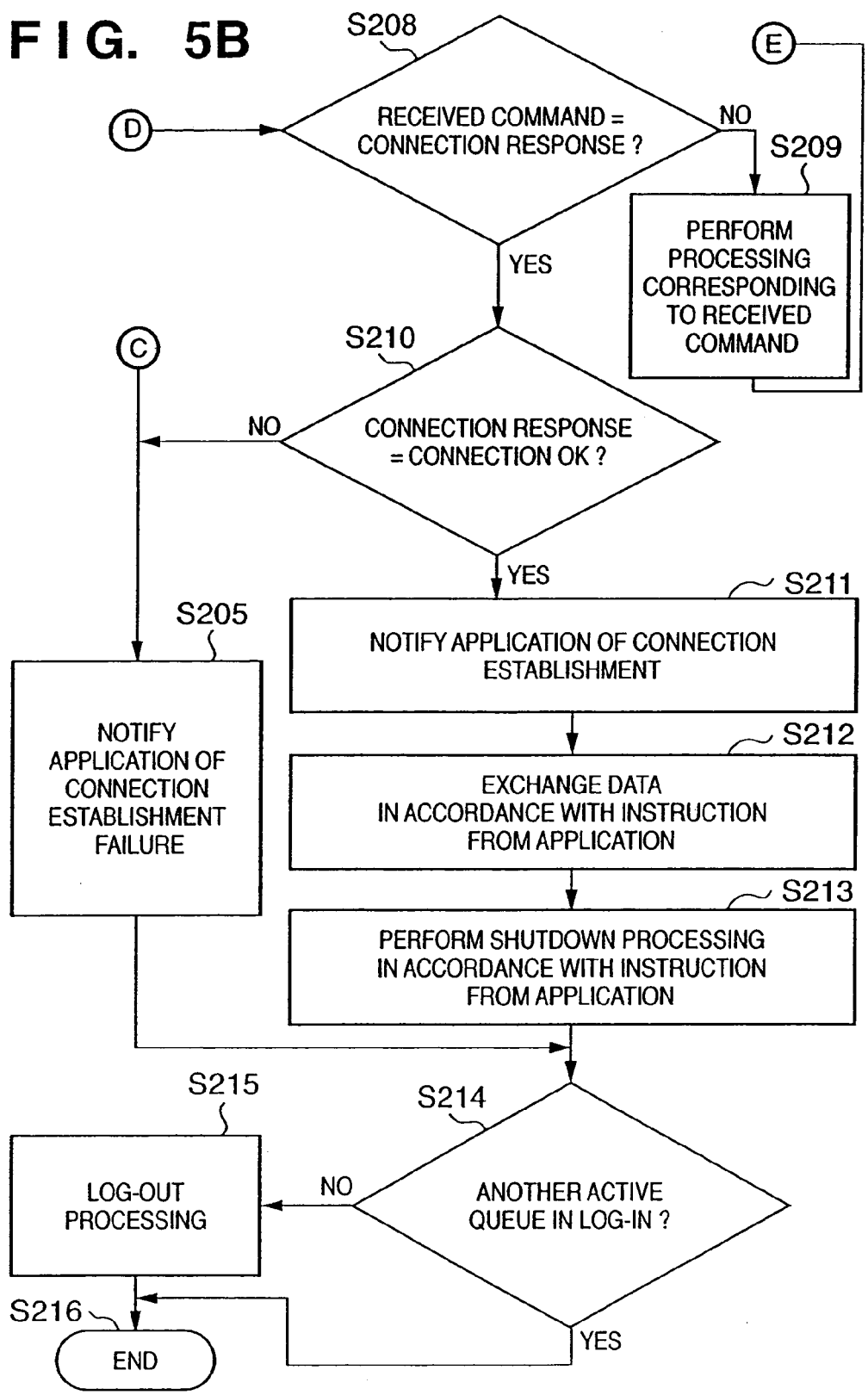

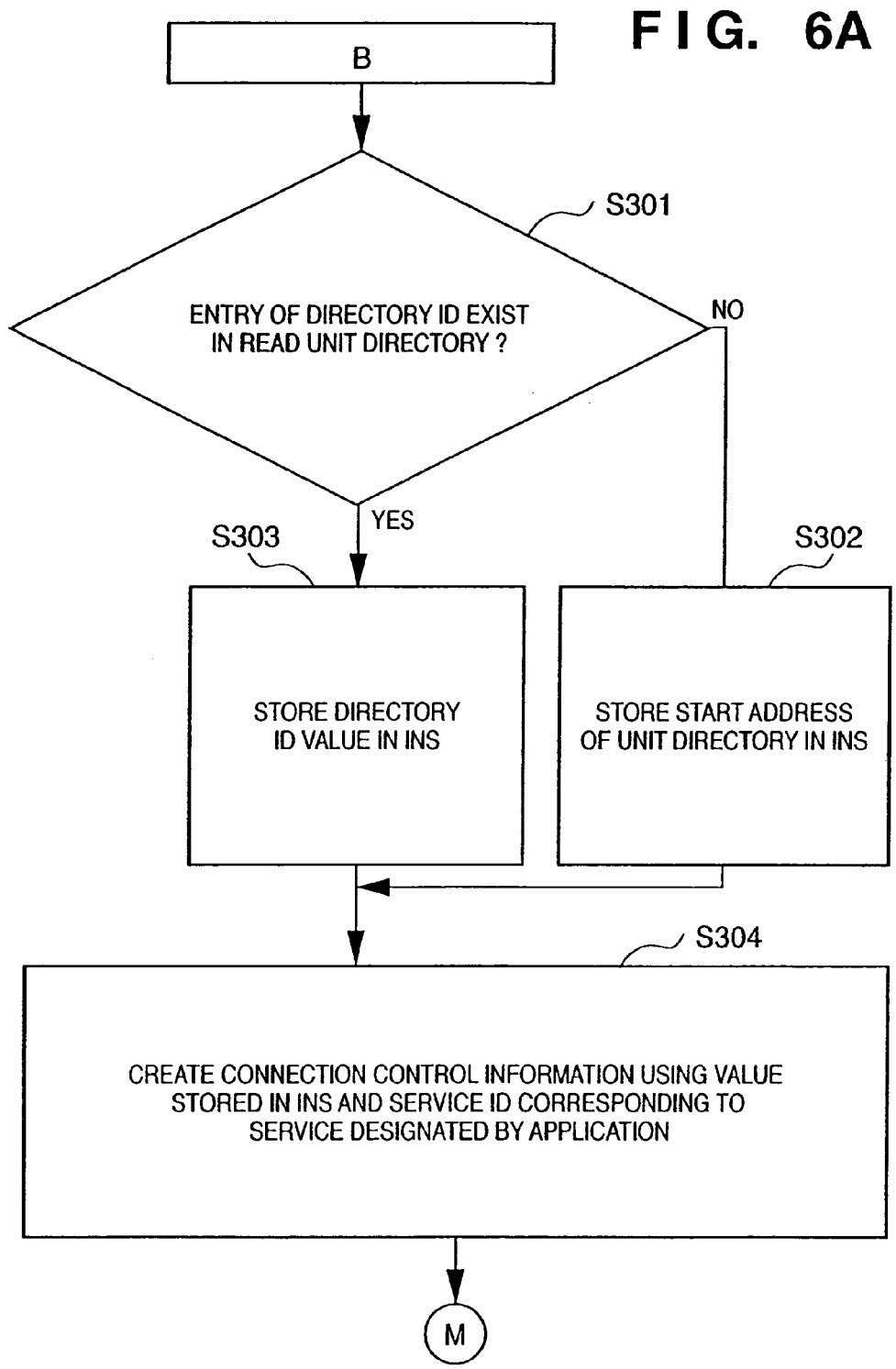

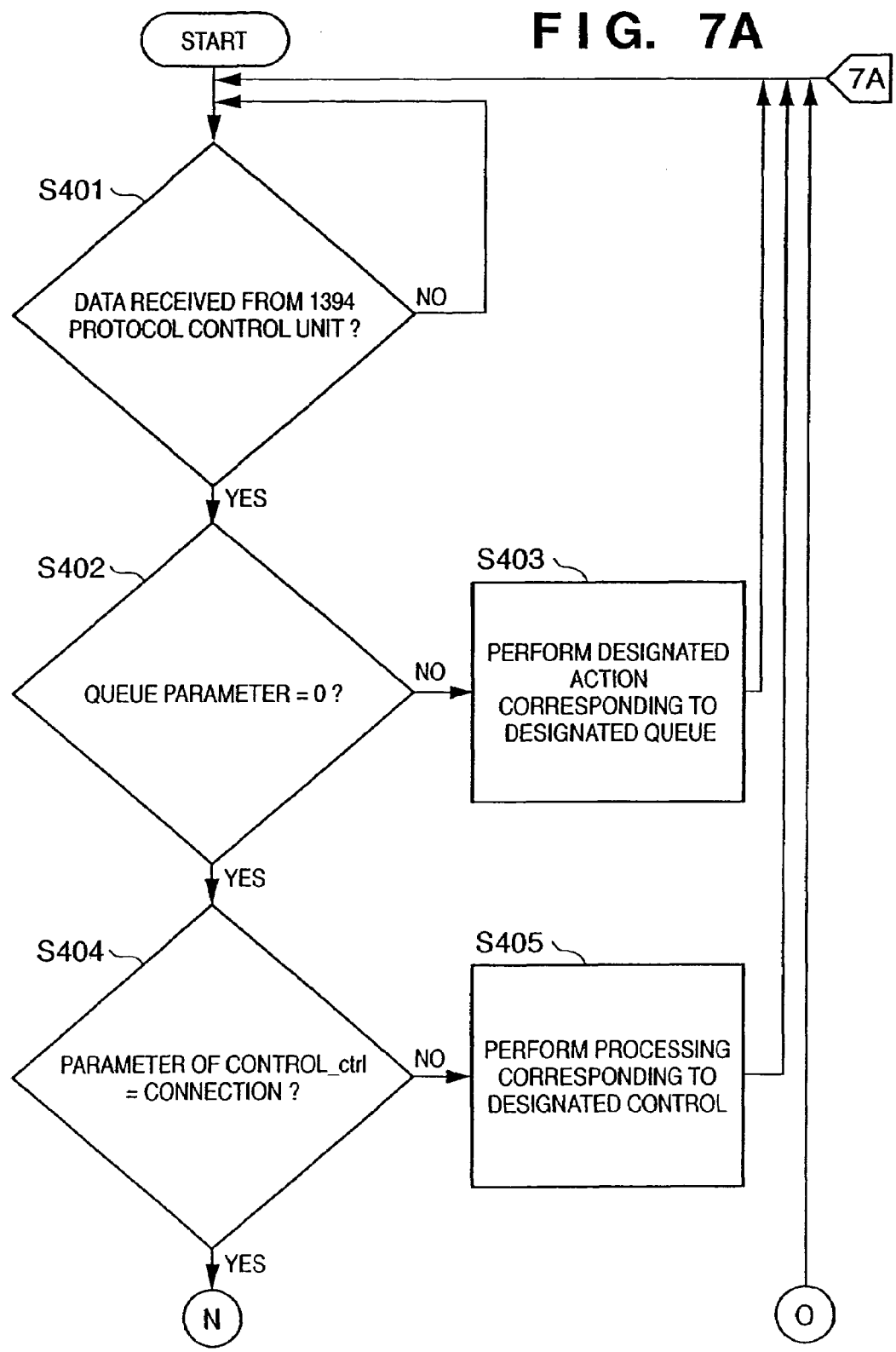

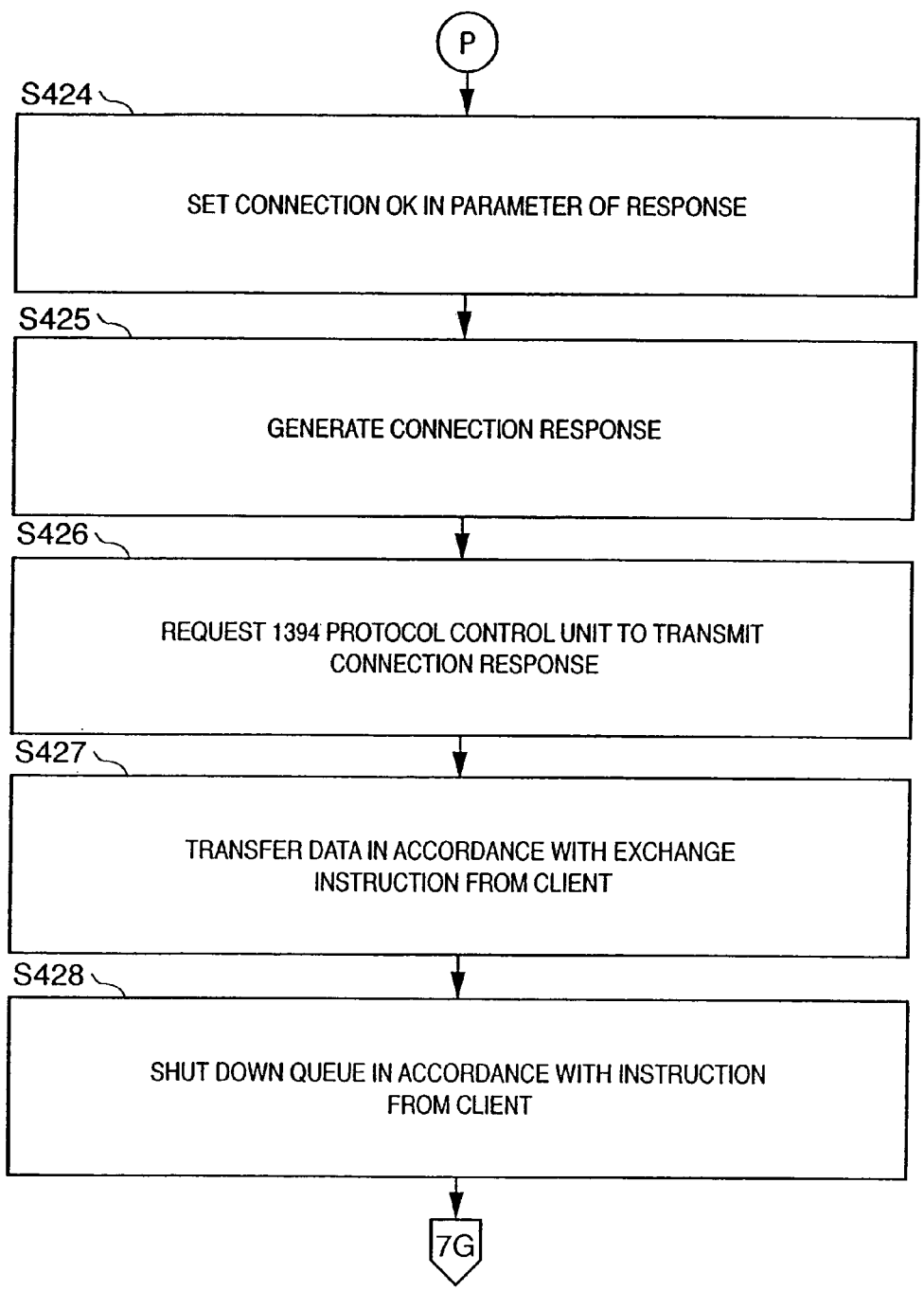

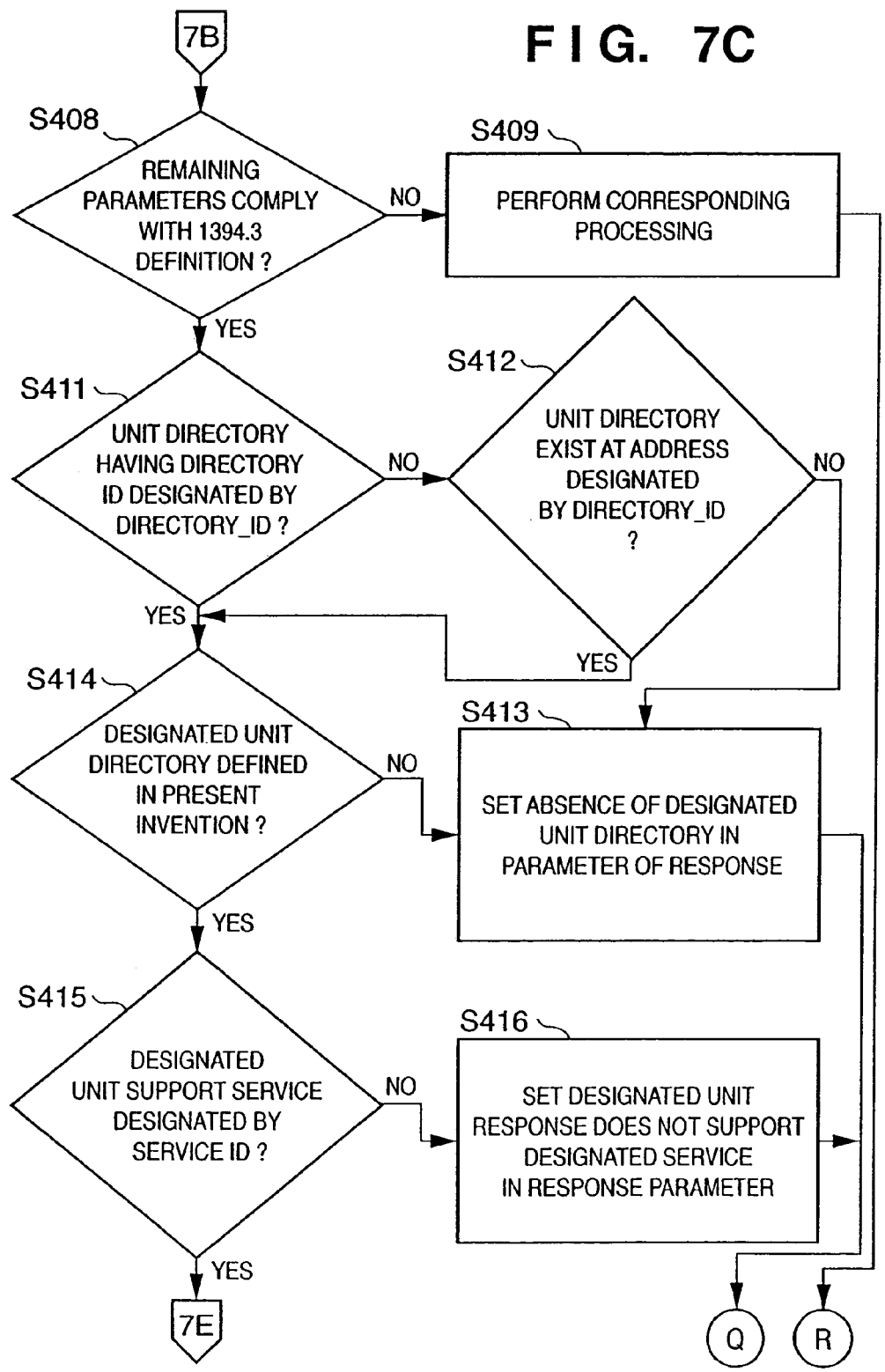

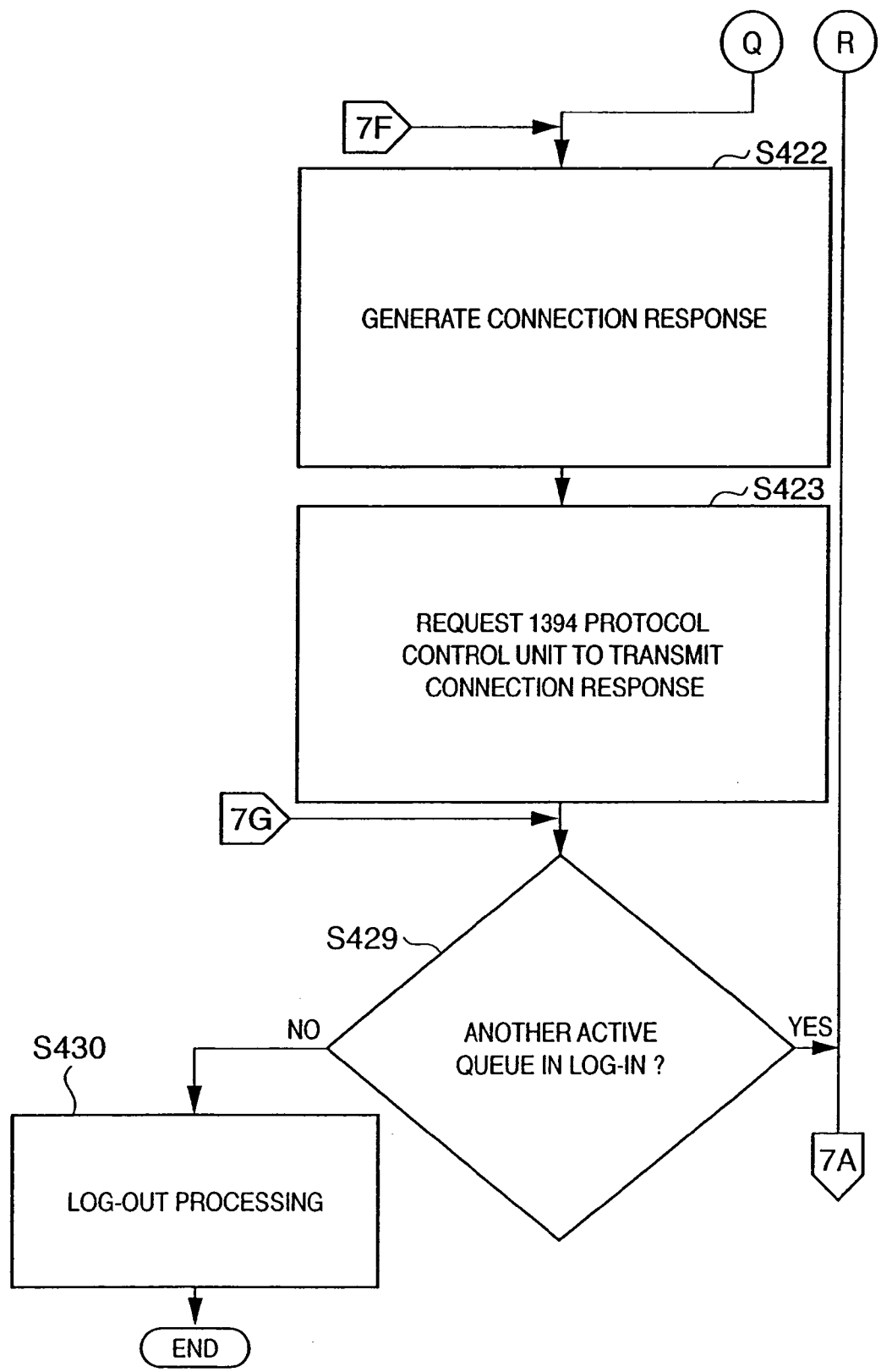

FIG. 8

| | ctrl_FUNCTION | RESPONSE | RESERVED |
|---|---|---|---|
| Rq | | | |

MOST SIGNIFICANT

| TASK_SLOTS | 5 |
| I2T_QUEUE | 4 |
| MODE | 0 |
| SERVICE_ID | 3 |
| P | R | N | 0 | 0 |

LEAST SIGNIFICANT

Rq               REQUEST     (1)
ctrl_FUNCTION    CONNECT    (1)
RESPONSE       DON'T CARE
TASK_SLOTS, I2T_QUEUE, MODE, AND SERVICE_ID COMPLY WITH IEEE 1394.3

FIG. 9

| | | | |
|---|---|---|---|
| MOST SIGNIFICANT | | | |
| Rq / ctrl_FUNCTION | RESPONSE | RESERVED | |
| TASK_SLOTS | | 5 | |
| I2T_QUEUE | | 4 | |
| MODE | | 0 | |
| SERVICE_ID | | 3 | |
| DIRECTORY_ID | 2 F | 4 2 | 5 6 |
| P | R | N 0 | 0 |

LEAST SIGNIFICANT

Rq          REQUEST       (1)
ctrl_FUNCTION  CONNECT    (1)
RESPONSE    DON'T CARE
TASK_SLOTS, I2T_QUEUE, MODE, AND SERVICE_ID COMPLY
WITH IEEE 1394.3
DIRECTORY_ID COMPLIES WITH DEFINITION IN THE DRAWING Rq        RESPONSE    (0)
ctrl_FUNCTION  CONNECT  (1)
RESPONSE  OK (0)

Rq          RESPONSE   (0)
ctrl_FUNCTION  CONNECT    (1)
RESPONSE    6

Rq          RESPONSE    (0)
ctrl_FUNCTION   CONNECT     (1)
RESPONSE    7

FIG. 14

| ID | PARAMETER NAME | VALUE | DESCRIPTION |
|---|---|---|---|
| 0 | | 0 | REPRESENTS END OF PARAMETER LIST IN CONTROL INFORMATION (OPTION). |
| 1 | TASK_SLOTS | 1 PER QUEUE AT MINIMUM | MAXIMUM NUMBER OF ALLOWABLE ORBs IN TASK SET FOR SPECIFIC CONNECTION. INITIATOR CAN PROVIDE THIS PARAMETER IN ORDER TO MONITOR RESTRICTION POSED BY TARGET AND DISPLAY RESTRICTION POSED BY INITIATOR. TASK SLOT IS ASSIGNED EVERY CONNECTION AND CAN BE USED FOR ANY CONNECTION QUEUE. |
| 2 | I2T_QUEUE | NONZERO: $FF_{16}$ AT MAXIMUM | QUEUE NUMBER ASSIGNED TO CONNECTION FOR TRANSFERRING APPLICATION DATA FROM INITIATOR TO TARGET. |
| 3 | T21_QUEUE | | QUEUE NUMBER ASSIGNED TO CONNECTION FOR TRANSFERRING APPLICATION DATA FROM TARGET TO INITIATOR. |
| 4 | MODE | 0, 1 | SPECIFIES DESIRED MODE WHEN CONNECTION TO GIVEN SERVICE IS ESTABLISHED. 0 SPECIFIES DATAGRAM MODE, AND 1 SPECIFIES STREAM MODE. |
| $5_{16}$ | DIRECTORY_ID | 24 BITS | SPECIFIES UNIT DIRECTORY OF UNIT IN INITIATOR WHICH TARGET TRIES TO CONNECT. THIS VALUE IS ADDRESS OF UNIT DIRECTORY OR DIRECTORY_ID CONTAINED IN UNIT DIRECTORY WHICH TARGET TRIES TO CONNECT. |
| $80_{16}$ | SERVICE_ID | 40 BYTES AT MAXIMUM | ASCII CHARACTER STRING WHICH IDENTIFIES EACH SERVICE (EXCEPT START AND END BLANKS). |
| $81_{16}$ | QUEUE_ INFORMATION | | BITMAP WHICH REPORTS PENDING STATE OF TARGET DATA FOR QUEUE OTHER THAN CONTROL. |

FIG. 15

| RESPONSE | DEFINITION |
|---|---|
| 0 | REQUEST COMPLETION OK; RESPONSE PARAMETER IS SIGNIFICANT. |
| 1 | UNKNOWN CONTROL FUNCTION |
| 2 | LACK OF RESOURCE WHICH CAN BE USED TO COMPLETE REQUEST; REQUEST CAN BE SUCCESSFUL BY RESENDING SAME REQUEST LATER. |
| 3 | SERVICE IDENTIFIED BY SERVICE_ID PARAMETER DOES NOT EXIST. |
| 4 | QUEUE PARAMETER IN CONNECTION REQUEST MISMATCHES PARAMETER PREDICTED FROM SERVICE. |
| 5 | CONNECTION REQUEST IS REJECTED. |
| 6 | UNIT DIRECTORY IDENTIFIED BY DIRECTORY_ID PARAMETER DOES NOT EXIST. |
| 7 | UNIT SPECIFIED BY DIRECTORY_ID PARAMETER DOES NOT SUPPORT SERVICE IDENTIFIED BY SERVICE_ID. |
| $FF_{16}$ | IDENTIFICATION ERROR |

FIG. 17

| DIRECTORY ENTRY | | | |
|---|---|---|---|
| NAME | TYPE | ESSENTIAL | DESCRIPTION |
| SPECIFIER_ID | 1 | Y | BY SPECIFIER_ID AND VERSION, STANDARD IS IDENTIFIED AS DOCUMENT WHICH SPECIFIES BASIC SOFTWARE. |
| VERSION | 1 | Y | |
| DIRECTORY_ID | 1 | | DIRECTORY_ID WHOSE FORMAT ID IS DEFINED BY IEEE 1212r. |
| FEATURE_DIRECTORY | D | | ADDITIONAL INFORMATION WHICH DESCRIBES FUNCTION (GENERALLY INDEPENDENT OF SOFTWARE INTERFACE AND COMMAND SET) OF UNIT. |

SPECIFIER_ID ENTRY  24-BIT VALUE  00 5029$_{16}$,
VERSION ENTRY,  24-BIT VALUE  1

| Rq | RESPONSE | (0) |
| ctrl_FUNCTION | CONNECT | (1) |
| RESPONSE | 5 | |

COMMUNICATION SYSTEM AND COMMUNICATION CONTROL APPARATUS AND METHOD

This application is a continuation of International Patent Application No. PCT/JP01/09504, filed Oct. 30, 2001, and published on May 10, 2002 in the Japanese (not English) language as International Publication No. WO 02/37768 A1.

TECHNICAL FIELD

The present invention relates to a communication control apparatus and method for controlling data transfer between two devices and, more particularly to a communication control apparatus and method using IEEE 1394 as a communication protocol.

BACKGROUND ART

One of communication protocols defined by IEEE (Instituted of Electrical and Electronics Engineers) is IEEE 1394. A communication scheme defined by IEEE 1394 realizes higher-speed bidirectional communication, compared to a handshake scheme. A device connected by an IEEE 1394 serial bus which is a memory bus model interface can access an address designated by a partner. IEEE 1394 defines the protocols of physical and link layers for wider applications, and does not define detailed protocols for each device.

An SBP-2 (Serial Bus Protocol-2) protocol is defined as the protocol of a transport layer utilizing IEEE 1394 as the physical/link layer. SBP-2 fully exploits the features of an IEEE 1394 memory bus model, and a command receiving side can receive data from a transmitting side at the convenience of the receiving side in accordance with SBP-2. Two devices connected by SBP-2 are a command transmitting side called an initiator and a receiving side called a target, and the initiator takes the initiative to start communication. Log-in operation can be performed by only the initiator, and the target operates in response to an action from the initiator in principle.

According to SBP-2, when the initiator logs in, the initiator creates a block ORB (Operation Request Block) which describes a memory address or the like used to exchange data, and notifies the target of the ORB address. The target reads the notified ORB, and reads out data from the described address, or writes data at the address, thereby realizing exchange of data. The ORB address is queued in the target, and its response is queued in the initiator. The target sequentially processes queued ORBS, and sends back responses to the initiator. A queue containing an ORB to be processed is called an active queue.

An IEEE 1394.3 standard which defines reverse log-in which prompts the initiator from the target to log in is also proposed as a protocol of the transport layer in addition to SBP-2. In IEEE 1394.3, log-in operation can be executed by only the initiator, and the target operates in response to an action from the initiator in principle. However, the target can perform reverse log-in operation which prompts the initiator to log in.

Since the initiator takes the initiative, the initiator generally has a larger number of sources. The standard causes the initiator to provide various services, and the target designates and receives a desired service.

The IEEE 1394 standard assumes that nodes connected to each other constitute one device. This is because IEEE 1394 inherits, e.g., a SCSI (Small Computer System Interface) definition which assumes each node as a single device in order to eliminate cumbersome management of a plurality of devices within one node. When a target defined by IEEE 1394.3 is to be connected to an initiator defined by IEEE 1394.3 by a method defined by IEEE 1394.3, the target specifies only a service ID as a parameter which specifies a service with respect to the initiator.

When, therefore, the initiator contains a plurality of logical devices, the current connection method defined by IEEE 1394.3 cannot designate a logical device. If the target wants to utilize the service of a specific logical device within the initiator in which a plurality of logical devices support services having the same ID, the logical device cannot be specified by the IEEE 1394.3 connection method.

The present invention has been made in consideration of the prior art, and has as its object to provide a communication control apparatus and method which enable managing each logical device in an initiator when the initiator has a plurality of logical devices, and allow target to designate a logical device and a service provided by each logical device.

DISCLOSURE OF INVENTION

To achieve the above object, the present invention has the following arrangement.

There is provided a communication system having a plurality of electronic devices connected by a line and communication control method defined by IEEE 1394, wherein an initiator device functioning as an initiator defined by IEEE 1394.3 comprises at least one of (1) an initiator unit directory defined by IEEE 1394.3, and (2) an initiator unit directory having a version entry value of the unit directory different from a value defined by IEEE 1394.3 and remaining values defined by IEEE 1394.3, and a target device which is connected to the initiator device via an IEEE 1394 line and functions as a target defined by IEEE 1394.3 comprises means capable of reading the unit directory of the initiator device via the IEEE 1394 line in order to recognize a service provided by the initiator device, and when a read content contains a unit directory and the unit directory is an initiator unit directory having a version entry of 0 or 1 and remaining entry values defined by IEEE 1394.3, analyzing the entries except the version entry in accordance with an IEEE 1394.3 definition.

Preferably, the target device further comprises means for, when an application of the target device requests a service provided by a given initiator device, determining whether a version entry value of a unit directory in a memory of the initiator device which may provide the service is 0 or 1.

When the version entry value of the unit directory is 1, the target device preferably determines whether the unit directory contains an entry of a directory ID, and when the unit directory contains the directory ID, extracts and stores a value of the directory ID.

When the version entry value of the unit directory is 1 and the unit directory contains the entry of the directory ID in generating a connection parameter defined by IEEE 1394.3, the target device preferably adds a value of the directory ID as a connection parameter.

When the version entry value of the unit directory is 1 and the unit directory does not contain the entry of the directory ID in generating a connection parameter defined by IEEE 1394.3, the target device preferably adds an address of the stored unit directory as a connection parameter.

The initiator device preferably has a function of determining presence/absence of an added parameter upon reception of the connection parameter defined by IEEE 1394.3 from the target device.

Preferably, the initiator device further comprises means for, when the added parameter exists, confirming whether a unit directory designated by the parameter exists, and means for, when the unit directory exists, confirming whether a content of the unit directory is an initiator unit directory defined by IEEE 1394.3 except the version entry.

The initiator device preferably sends back connection rejection to the target device when the added parameter exists and a unit directory designated by the parameter does not exist or a content of the unit directory does not comply with an initiator unit directory defined by IEEE 1394.3 except the version entry.

Preferably, the initiator device further comprises a function of, when the added parameter exists, a unit directory designated by the parameter exists, and a content of the unit directory complies with an initiator unit directory defined by IEEE 1394.3 except the version entry, determining whether a service ID designated by the parameter is supported by the unit directory designated by the parameter.

The initiator preferably sends back connection rejection to the target device when the added parameter exists, a unit directory designated by the parameter exists, a content of the unit directory complies with an initiator unit directory defined by IEEE 1394.3 except the version entry, and a service ID designated by the parameter is not supported by the unit directory designated by the parameter.

The initiator preferably sends back connection OK to the target device when the added parameter exists, a unit directory designated by the parameter exists, a content of the unit directory complies with an initiator unit directory defined by IEEE 1394.3 except the version entry, and a service ID designated by the parameter is supported by the unit directory designated by the parameter.

Alternatively, a communication control apparatus which has at least one logical device and is connected to a network together with an initiator device which manages a providable service for each logical device comprises acquisition means for acquiring information representing a logical device and a connection procedure of the logical device from an initiator device designated by a connection request, first determination means for determining based on the information acquired by the acquisition means whether a logical device of the initiator device can be connected by a first connection procedure, connection means for designating an identifier which specifies the logical device and an identifier of a service designated by the connection request with respect to the logical device determined by the first determination means to be connectable by the first connection procedure, and establishing connection between the communication control apparatus and the initiator device by the first connection procedure, and request means for requesting the designated service by the designated logical device via the connection established by the connection means.

It is preferable that the communication control apparatus further comprise second determination means for determining based on the information acquired by the acquisition means whether the logical device of the initiator device can be connected by a second connection procedure, the connection means designate the identifier of the service designated by the connection request with respect to the logical device determined by the second determination means to be connectable by the second connection procedure, and establish connection between the communication control apparatus and the initiator device by the second connection procedure, and the request means request the designated service via the connection established by the connection means.

Alternatively, a communication control apparatus which is connected to a network together with a target device which requests connection by designating a logical device identifier and a service identifier or designating a service identifier in accordance with a connection request comprises first determination means for, when a connection request is received from the target device, determining whether the request contains an identifier which specifies a logical device, second determination means for, when the first determination means determines that the request contains the identifier, determining whether a logical device specified by the identifier provides a service specified by a service identifier contained in the connection request, connection means for, when the second determination means determines that the logical device provides the service, establishing connection in response to the connection request, and providing means for providing the designated service from the designated logical device via the connection established by the connection means.

It is preferable that the communication control apparatus further comprise third determination means for, when the first determination means determines that the connection request does not contain an identifier which specifies a logical device, determining whether the communication control apparatus provides a service specified by a service identifier contained in the connection request, and the connection means establish connection in response to the connection request when the third determination means determines that the communication control apparatus provides the service, and the providing means provide the designated service via the connection established by the connection means.

BRIEF DESCRIPTION OF DRAWINGS

FIG. 3A is a block diagram showing the schematic hierarchy of a config ROM mounted in the initiator to which the present invention is applied;

FIG. 5B is a flow chart showing the operation of the target to which the present invention is applied;

FIG. 7C is a flow chart showing the operation of the initiator to which the present invention is applied;

FIG. 8 is a view showing the structure of a connection control function (CONNECT) request defined by IEEE 1394.3;

FIG. 9 is a view showing the structure of the connection control function (CONNECT) request extended from the IEEE 1394.3 definition in order to apply the present invention;

FIG. 14 is a table showing connection control function (CONNECT) values extended from the IEEE 1394.3 definition in the present invention, and directory IDs representing extended items in correspondence with the meanings of the extended values;

FIG. 15 is a table showing connection control function (CONNECT) response values extended from the IEEE 1394.3 definition in the present invention, and "6" and "7" representing extended items in correspondence with the meanings of the extended values;

FIG. 17 is a table showing the structure of a unit directory when the present invention is applied;

BEST MODE OF CARRYING OUT THE INVENTION

FIRST EMBODIMENT

A communication system and an initiator and target which constitute the communication system according to an embodiment of the present invention will be described in detail below with reference to the accompanying drawings. In the following description, a term "complying with a definition of the present invention" or a similar term means merely a restriction by the arrangement or sequence (to be described in the embodiment) of a system, apparatus, or method according to the present invention, and does not represent that the present invention itself is a standard or convention.

<System Configuration>

The first embodiment is schematically as follows. According to the IEEE 1394.3 definition, an initiator unit directory for defining a device (unit) at the node of an initiator has only one physical node (node connected to a 1394 serial bus; also called a physical device). This definition is extended to allow one physical node to have a plurality of initiator unit directories. Each initiator unit directory is assigned an identifier, and if the target must connect a queue defined by IEEE 1394.3 to the initiator, the identifier is added to the parameter of a connection request command as a parameter which designates a logical device. The logical device means each of devices which constitute one physical node. For example, when a computer is a physical node, a local-connected scanner, printer, and modem are respective logical devices.

Figure 3B:
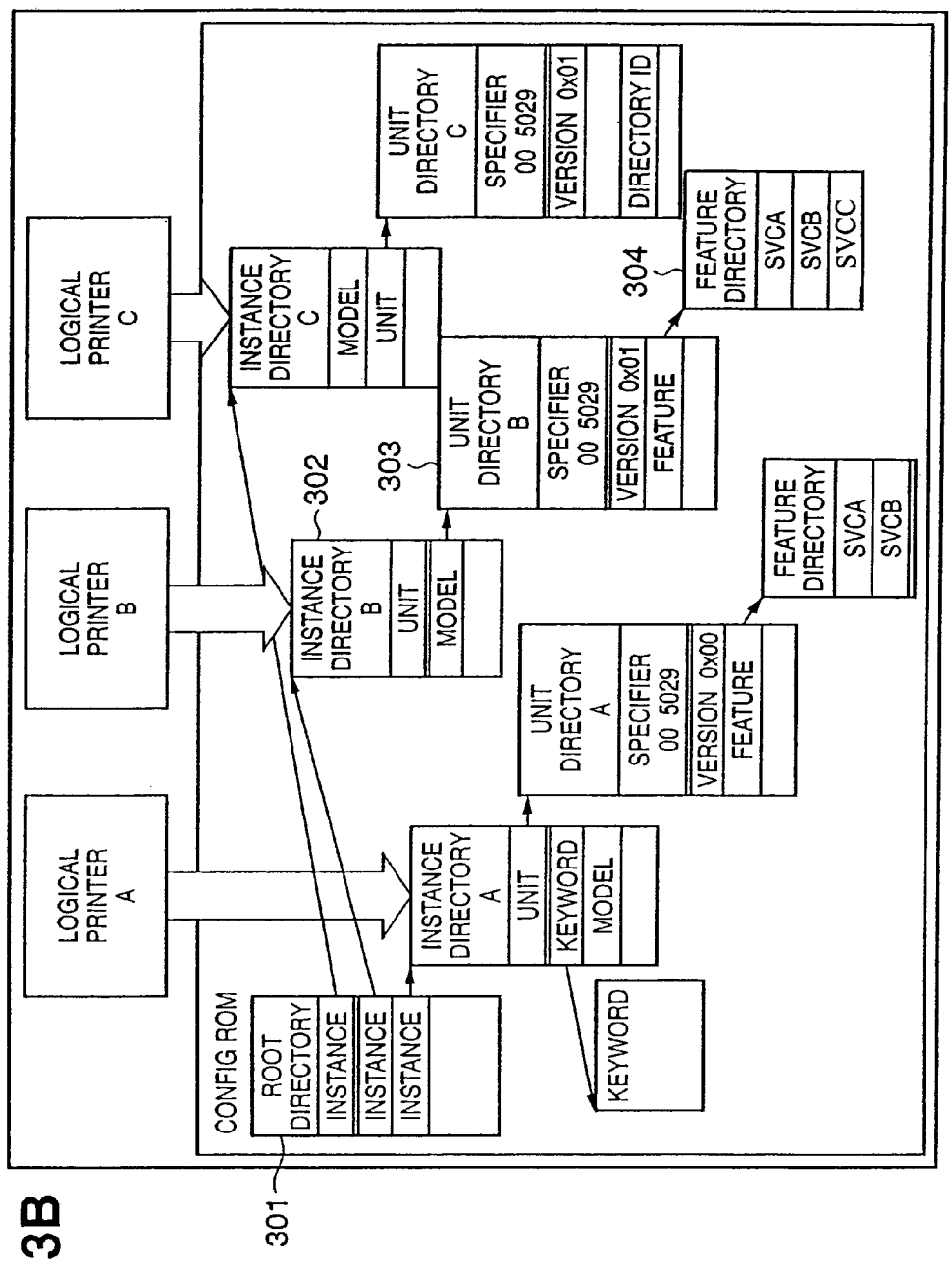
FIG. 3B is a block diagram showing examples of entry values of the config ROM mounted in the initiator to which the present invention is applied.
Figure 16:
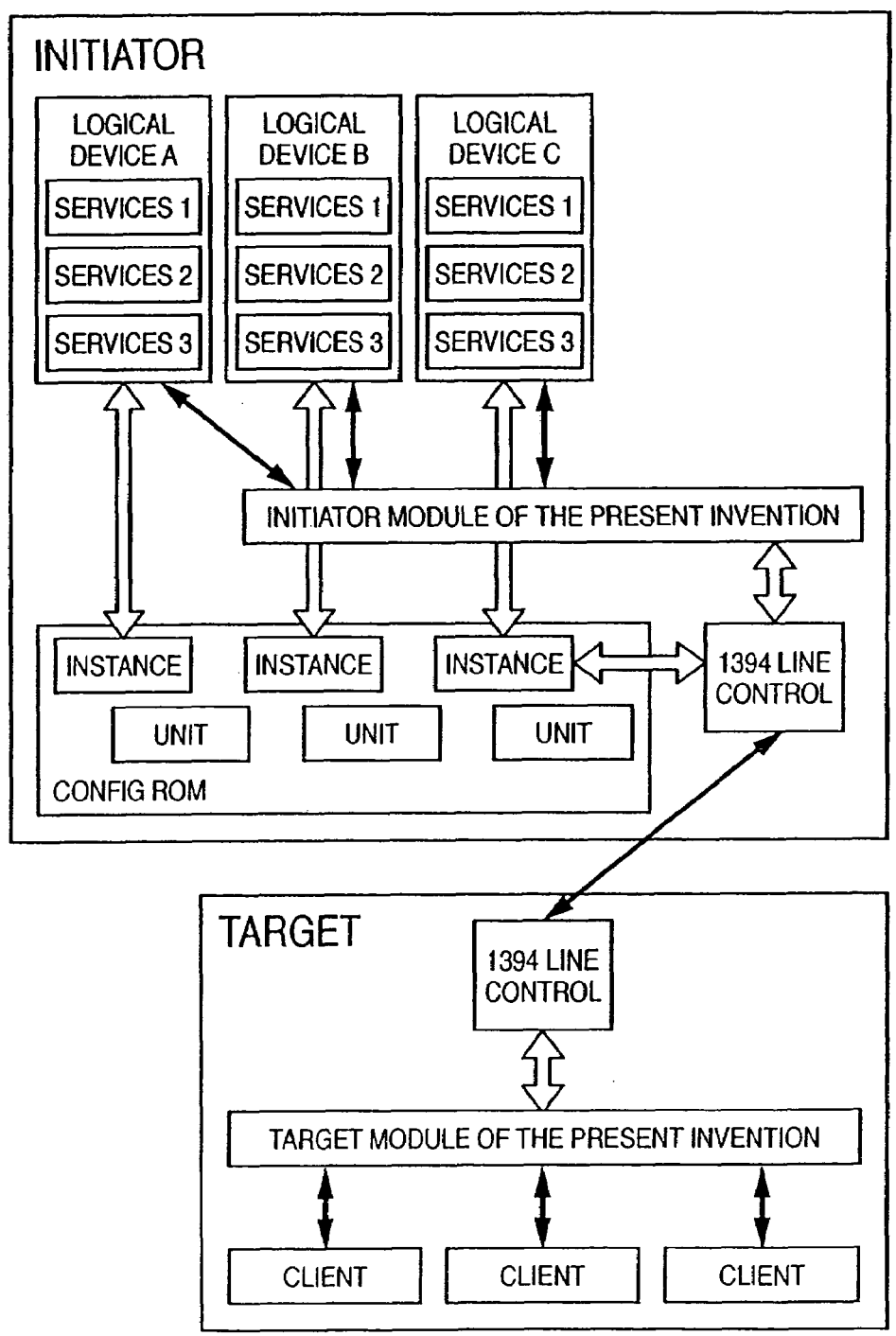
FIG. 16 is a block diagram showing the model of an example of the relationship between the initiator, the target, the config ROM of the initiator, and modules of the present invention when the present invention is applied.

FIG. 16 shows a schematic device arrangement to which the present invention is applied. FIGS. 3A and 3B show examples of the internal arrangement of a config ROM in which data defining the arrangement of each node is registered.

In FIG. 16, the initiator of this system comprises logical devices A, B, and C. In this example, the devices are printers. Because of the identical devices, the logical devices provide the same services, e.g., services 1, 2 and 3. The config ROM (CONFIG ROM) defines each logical device.

The target has a client which utilizes a service provided by the initiator. The initiator and target are connected by a 1394 serial bus, and connected via 1394 line control units.

Figure 1:
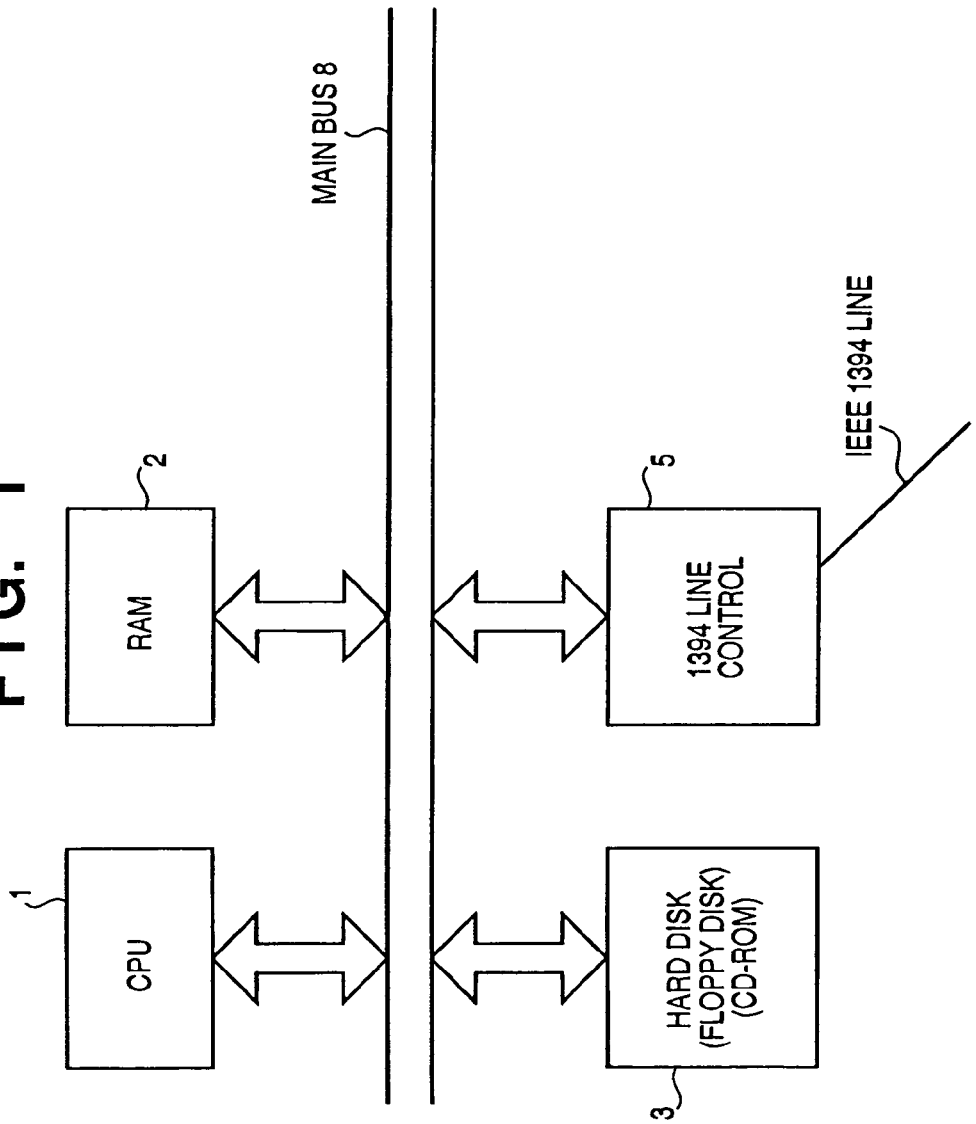
FIG. 1 is a block diagram showing a target to which the present invention is applied.

FIG. 1 is a block diagram showing the internal arrangement of a target electronic device defined by IEEE 1394.3 (to be referred to as a target hereinafter) to which the present invention is applied. Reference numeral 1 denotes a CPU which controls the present invention; 2, a RAM which provides the work area of the CPU 1; 3, a hard disk (floppy disk, CD-ROM, MO (Magnetic-Optic disk), ROM, magnetic tape, or the like) which provides the program of the present invention; 5, an IEEE 1394 line control unit; and 8, a main bus.

Figure 2:
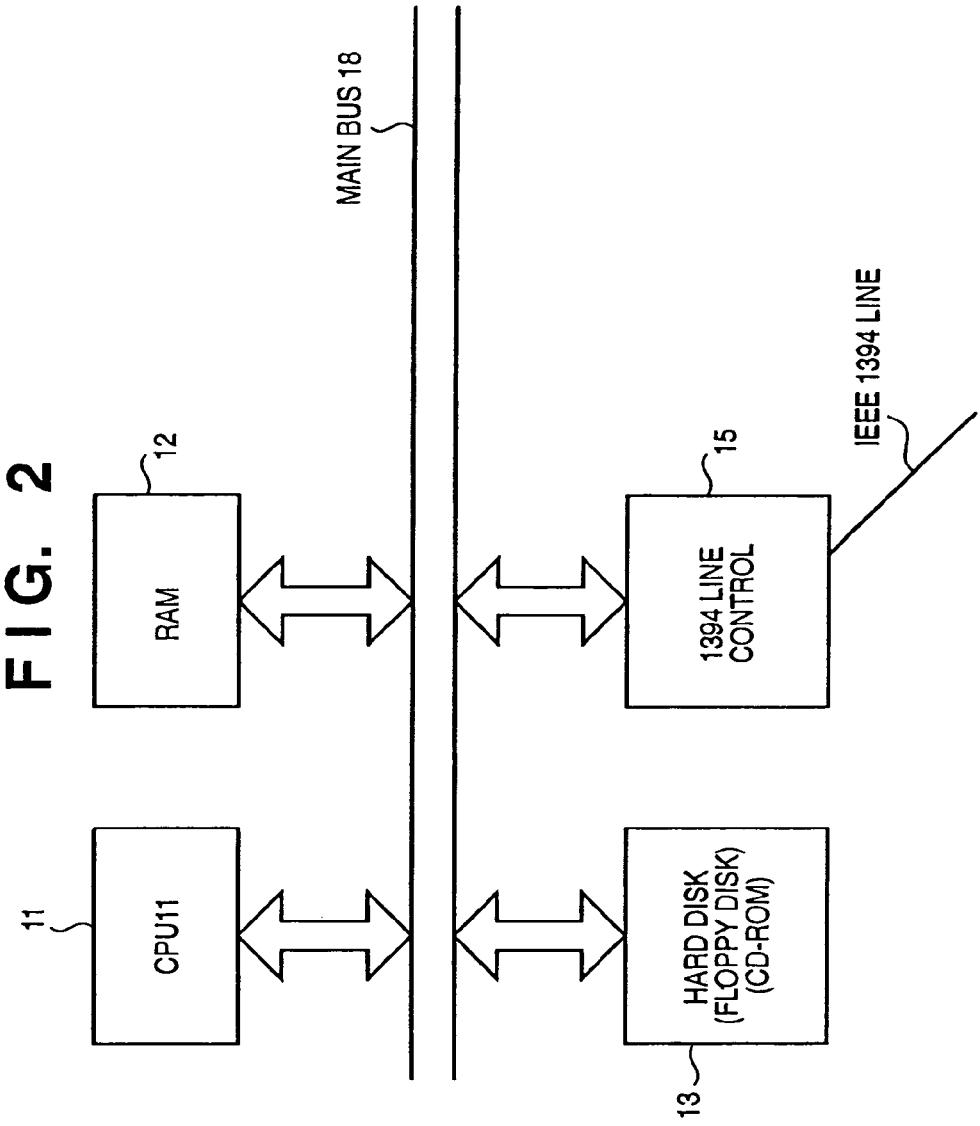
FIG. 2 is a block diagram showing an initiator to which the present invention is applied.

FIG. 2 is a block diagram showing the internal arrangement of an initiator electronic device defined by IEEE 1394.3 (to be referred to as an initiator hereinafter) to which the present invention is applied. Reference numeral 11 denotes a CPU which controls the present invention; 12, a RAM which provides the work area of the CPU 11 (and stores a config ROM); 13, a hard disk (floppy disk, CD-ROM, MO, ROM, magnetic tape, or the like) which provides the program of the present invention; 15, an IEEE 1394 line control unit; and 18, a main bus. The IEEE 1394 line control unit holds protocols defined by IEEE 1394 and SBP-2 (Serial Bus Protocol-2).

In the present invention, the CPUs of both the target and initiator control and operate the RAMs, hard disks, and IEEE 1394 line control units via the main buses in accordance with the program of the present invention, unless otherwise specified. The IEEE 1394 line control unit is also called an IEEE 1394 protocol control unit, which are the same in this embodiment.

<Contents of Config ROM>

FIG. 3A shows an example of the contents of the config ROM of the initiator according to the present invention. Configuration information is managed by directories with a hierarchical structure. An instance directory which defines a logical device lies below a root directory, and a unit directory which defines the logical device in more detail follows the instance directory. A feature directory which defines services and the like provided by each logical device is set below the unit directory.

FIG. 3B shows details of the directories. An instance directory which defines each logical device as an instance is linked below a root directory 301. For example, an instance directory 302 describes the model identifier of printer B serving as a logical device, and has a link to a lower unit directory 303. The unit directory contains a specifier which designates a protocol (in this embodiment, designates 0×5029 representing IEEE 1394), a protocol version, and a link to a feature directory 304 which defines a service. The feature directory 304 defines services A, B, and C which are services provided by logical device B.

It should be noted that initiator unit directory A complies with the IEEE 1394.3 definition though the version value of initiator unit directory B is different from the one defined by IEEE 1394.3 and the remaining items comply with the IEEE 1394.3 definition. That is, the version value of the initiator unit directory defined by IEEE 1394.3 is 0, but that of initiator unit directory B is A. This version number makes it possible to determine whether the current standard is the original IEEE 1394.3 standard or an extended standard described in the embodiment.

Initiator unit directory C contains an item DIRECTORY_ID (directory ID) in addition to the features of initiator unit directory B.

Initiator unit directory 3 contains an item DIRECTORY_ID (directory ID) in addition to the features of initiator unit directory 2.

Note that the present invention assumes that the target comprises necessary functions defined by IEEE 1394.3 and the initiator comprises necessary functions. The target and initiator are physically connected by a line defined by IEEE 1394 (see FIG. 16).

<Operation of Target>

The operation of the target according to the present invention will be explained in detail with reference to the flow charts of FIGS. 4A, 4B, 5A, 5B, 6A, and 6B. The operation will be first described with reference to FIGS. 4A and 4B.

Figure 4A:
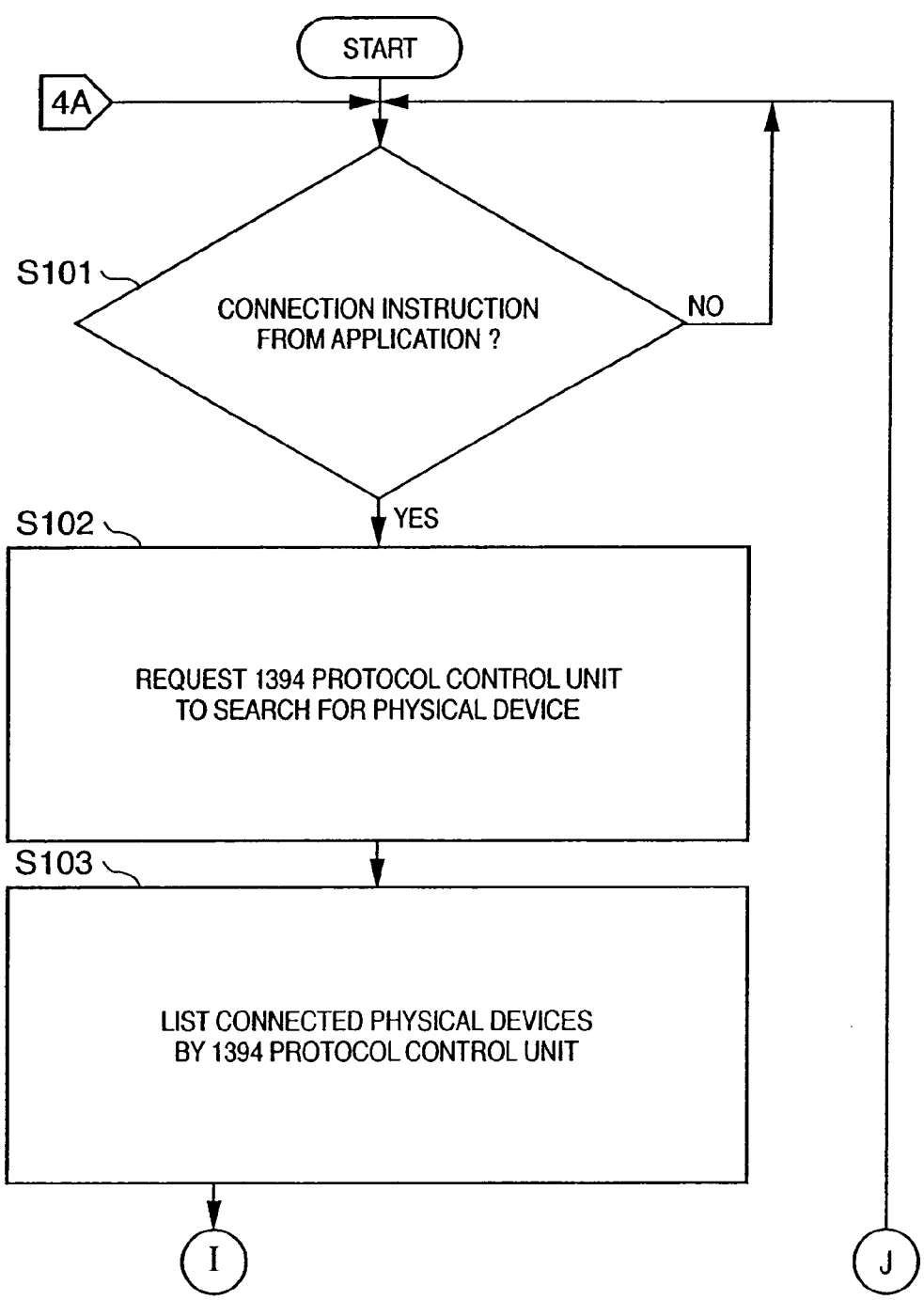
FIG. 4A is a flow chart showing the operation of the target to which the present invention is applied.
Figure 4A:
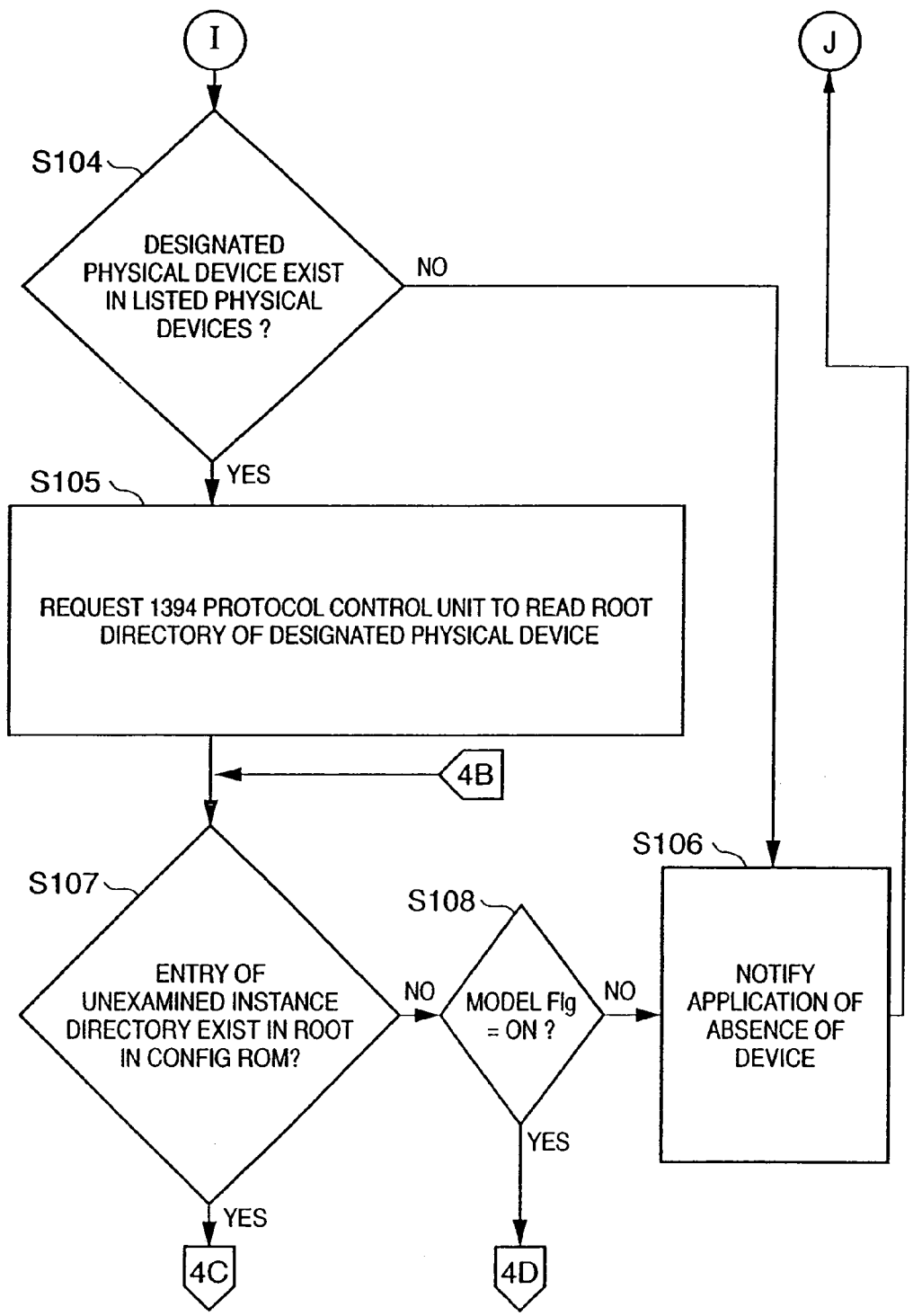
Figure 4B:
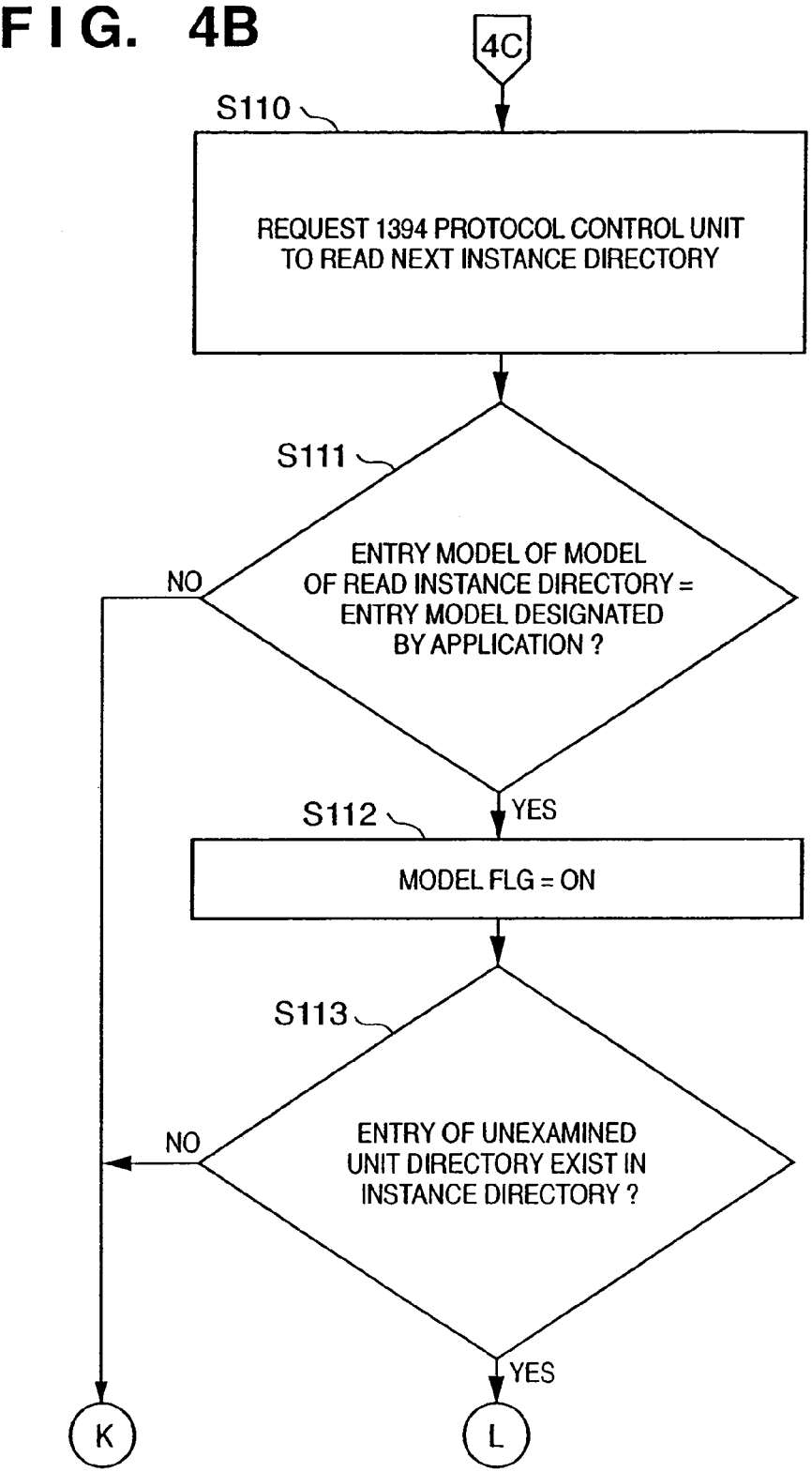
FIG. 4B is a flow chart showing the operation of the target to which the present invention is applied.
Figure 4B:
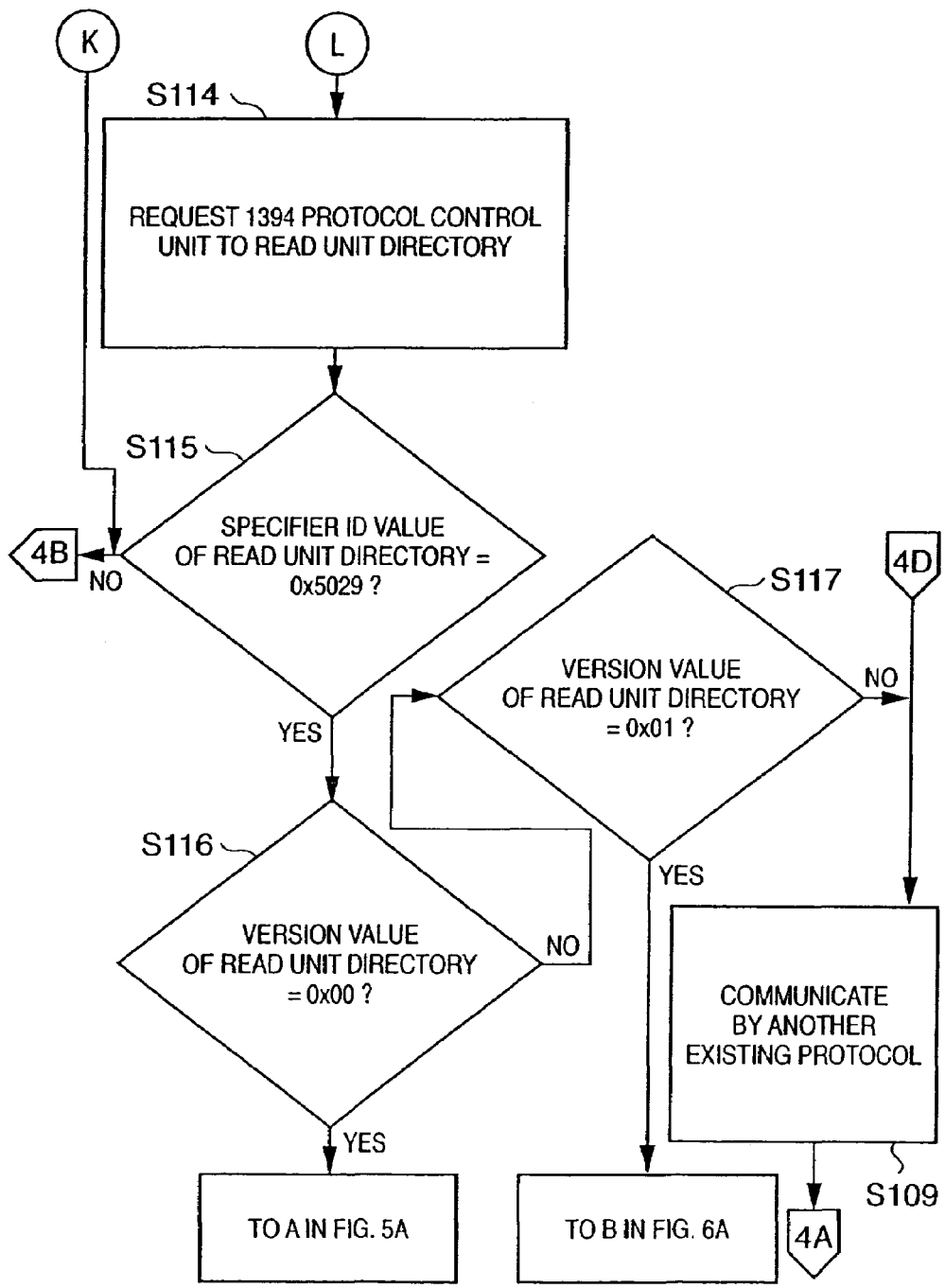

After a program for realizing the flow charts of FIGS. 4A and 4B is activated during initialization of the target device, the target waits for a connection request (connection instruction) accompanied by parameters which designate a physical device, logical device, and service from an application (S101). If the target receives such a connection request, the target instructs the 1394 line control unit 5 to list all physical devices (physical nodes) connected by a 1394 line (S102). Note that the 1394 protocol control unit in FIGS. 4A and 4B means the 1394 line control unit.

The 1394 line control unit 5 reads currently connected physical device names via the IEEE 1394 line (S103). The target receives a list of currently connected physical devices from the 1394 line control unit 5, and checks whether a physical device designated by the application is included in the list (S104). If NO in S104, the target notifies the application of the absence of the designated physical device (S106), and returns to S101.

If YES in S104, the target requests the 1394 line control unit 5 to read the root directory of the physical device (S105). The target inspects the root directory to check whether the root directory read by the 1394 line control unit 5 still has the entry of an instance directory whose attribute has not been examined yet (S107).

If the entries of all instance directories have been examined, the target checks whether MODELFLG is ON or OFF (S108). If MODELFLG is ON, the target can perform communication (connection) by a method other than the method of the present invention, and if possible, tries connection by another communication protocol (e.g., FCP) (FIG. 4B: S109). Thereafter, the target advances to S101. If MODELFLG is OFF, the target notifies the application of the absence of the designated logical device (S106), and returns to S101.

If the entries of unexamined instance directories exist in the root directory read by the 1394 line control unit 5 in step S107, the target requests the 1394 line control unit 5 to read an instance directory having the smallest address (S110). Then, the target checks whether the model written in the model entry of the instance directory read by the 1394 line control unit 5 coincides with a logical device to which the application has issued the connection request (S111). If NO in S111, the target returns to S107; if YES, turns on MODELFLG (S112). MODELFLG is initialized to "OFF" when the program which describes the procedures in FIGS. 4A and 4B is activated.

The target checks whether the entries of unexamined unit directories exist in the instance directory read by the 1394 line control unit 5 (S113). If the entries of all unit directories have been examined, the target determines that the current instance directory does not comply with procedures (protocol) defined by the embodiment, and advances to step S107.

If the entries of unexamined unit directories exist in the instance directory read by the 1394 line control unit 5, the target requests the 1394 line control unit 5 to read a unit directory having the smallest address (S114). Then, the target checks whether the value of the specifier ID item of the unit directory read by the 1394 line control unit 5 is 0×5029 (identifier of the group which defines IEEE 1394.3) (S115). If NO in S115, the target determines that the unit directory does not support IEEE 1394, and shifts to S107.

If YES in S115, the target checks the version entry value of the unit directory read by the 1394 line control unit 5 (S116). If the version entry value of the unit directory is 0×00, the target determines that the unit directory completely complies with IEEE 1394.3, and advances to A in FIG. 5A. If the version entry value of the unit directory is 0×01(S117), the target determines that the unit directory complies with extended IEEE 1394.3 procedures defined by the embodiment, and shifts to B in FIG. 6A. If the version entry value of the unit directory is not 0×00 or 0×01, the target can perform communication by another protocol, and if possible, executes the processing (S109).

<Operation of Target According to Present Invention>

The operation of the target according to the present invention in which the unit directory complies with the extended standard of IEEE 1394.3 will be explained with reference to FIG. 6.

The target checks whether a read unit directory contains the entry of a directory ID (S301). If YES in S301, the target stores the value in INS (directory identifier storage location) (S303); if NO, stores the start address of the read unit directory in INS (S302).

The target generates a connection control request containing a service ID corresponding to a service designated by an application and a directory ID assembled in the unit directory stored in INS (S304). The connection control request is shown in FIG. 9. More specifically, the value of the first Rq field is "1" representing a request, and that of the ctrl_function field is "CONNECT" representing connection.

The response field represents a request, and its value is arbitrary. The remaining fields are as shown in FIG. 9. In this case, the service ID of the connection control request is "PRN" (print), and DIRECTORY_ID is 2F4256. The definition of DIRECTORY_ID is shown in FIG. 14. DIRECTORY_ID shows a value which specifies a unit directory in an initiator which the target tries to connect.

The target checks whether log-in with the physical device of the initiator by SBP-2 has been established (S305). If NO in S305, the target requests the 1394 line control unit 5 to perform IEEE 1394.3 reverse log-in processing (S306). The target confirms whether log-in has been established by reverse log-in (S307). If NO in S307, the target notifies the application of a connection failure, and advances to step S308.

Figure 11:
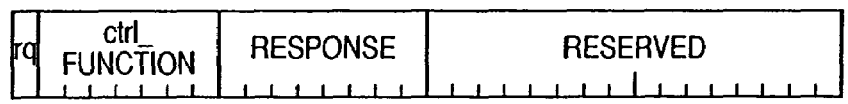
FIG. 11 is a view showing the structure of the connection control function (CONNECT) response defined by IEEE 1394.3 when the connection is OK.

If YES in S305 or S307, the target requests the 1394 line control unit 5 to transmit the connection control request (to be also simply referred to as connection) to the initiator by an IEEE 1394.3 method (S309). The 1394 line control unit 5 waits for a command from the physical device of the initiator (S310). If the 1394 line control unit 5 receives a command from the physical device of the initiator, the target checks whether the command is a response to the connection (to be also simply referred to as a connection response) (S311). If the connection response is OK, the values shown in FIG. 11 are sent back as a response. That is, the value "0" of the Rq field, the value "CONNECT" of the ctrl_function field, and the value "0" (representing "OK") of the response field are sent back.

If the command is not a response to the connection control request, the target performs processing corresponding to the command (S312). If the command is a connection response, the target determines from the response item whether the result is connection OK or NG (failure) (S313). If the connection is NG, the target notifies the application of a connection failure, and shifts to step S308; if the connection is OK, notifies the application that the service requested by the application can be utilized (S314). The target exchanges data in accordance with an instruction from the application (S315), and executes shutdown processing in accordance with an instruction from the application (S316).

The target checks whether another active queue exists in log-in (S317). If NO in S317, the target requests the 1394 line control unit 5 to perform log-out processing (S318), and ends the processing; if YES, directly ends the processing.

<Operation of Target Complying with IEEE 1394.3>

Figure 5A:
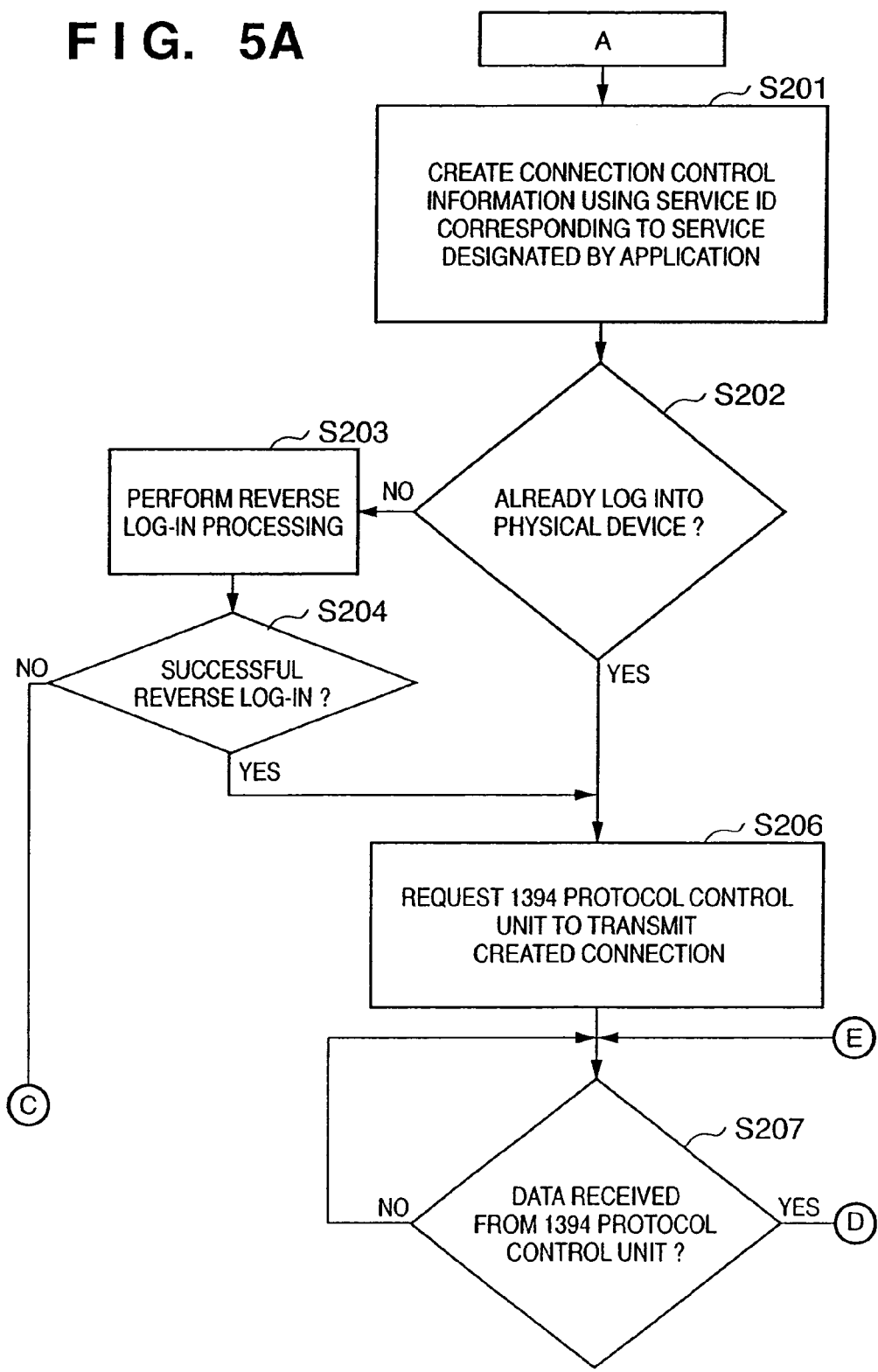
FIG. 5A is a flow chart showing the operation of the target to which the present invention is applied.
Figure 6A:
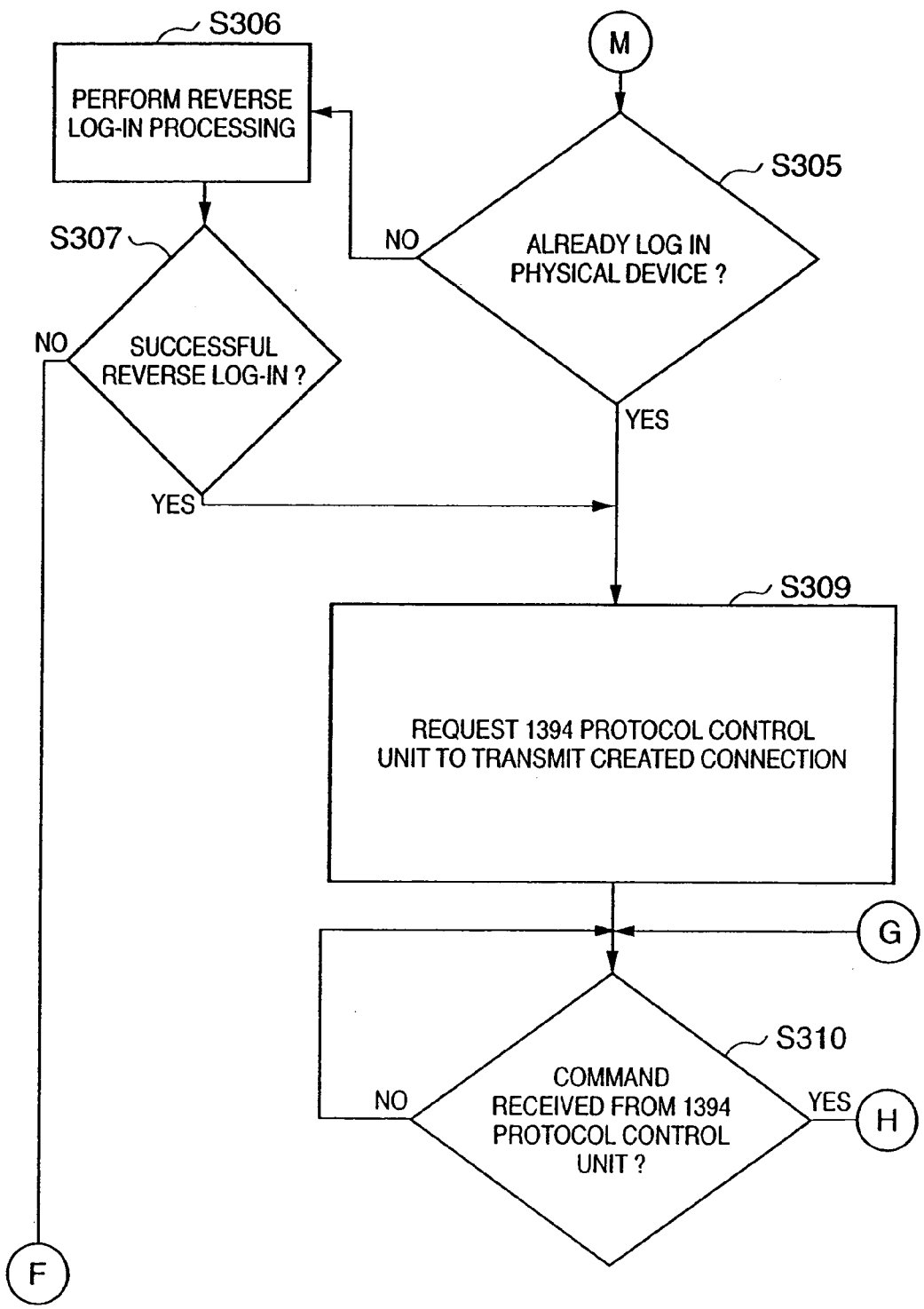
FIG. 6A is a flow chart showing the operation of the target to which the present invention is applied.
Figure 6B:
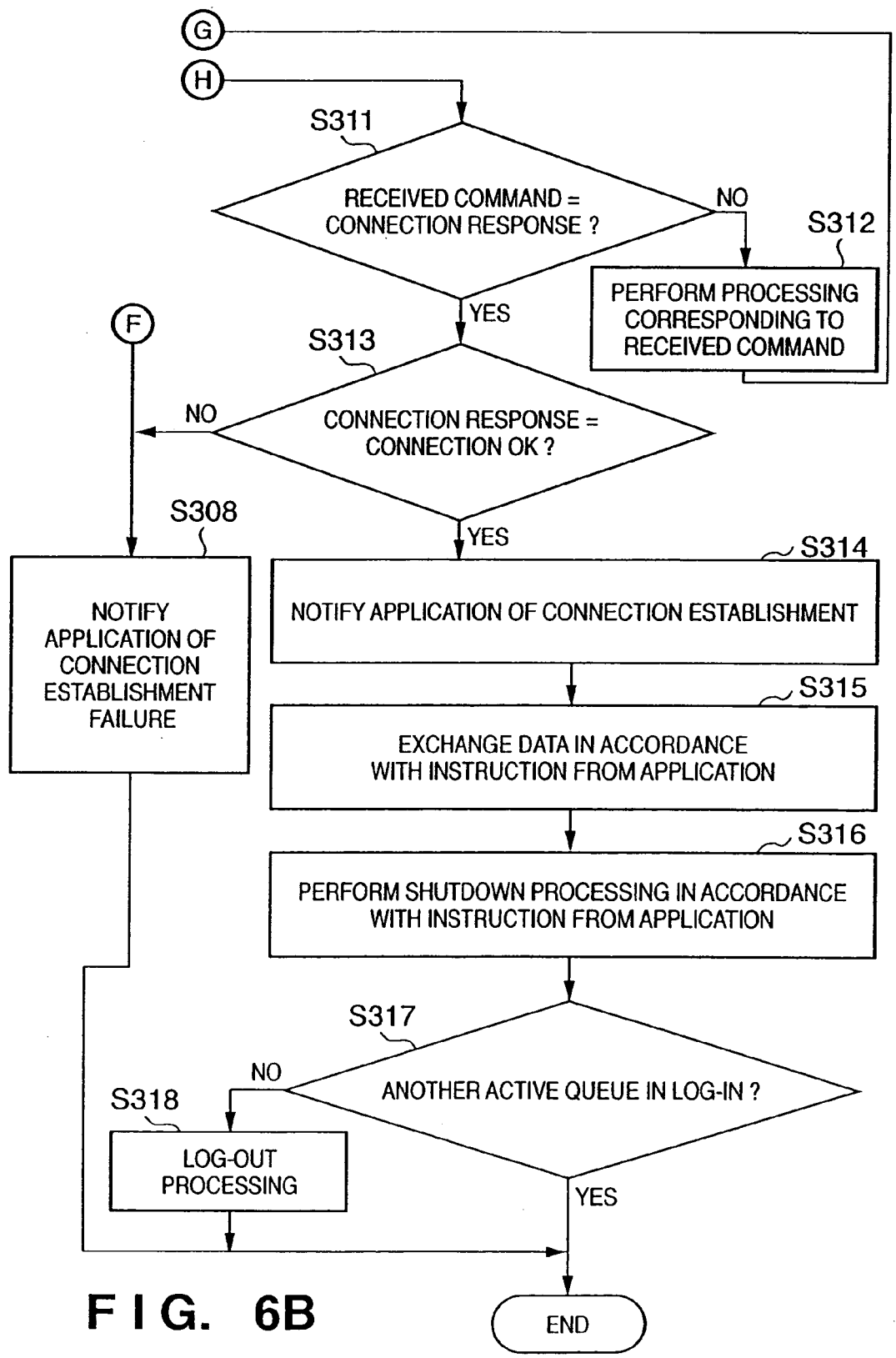
FIG. 6B is a flow chart showing the operation of the target to which the present invention is applied.

The operation of the target when the unit directory complies with IEEE 1394.3 will be described with reference to FIGS. 5A and 5B.

The target generates a connection control request in which a service ID corresponding to a service designated by an application is assembled (S201). The contents of the connection control request are shown in FIG. 8. The ctrl_function field contains "CONNECT" representing the connection control request. The remaining fields are as shown in FIG. 8. In this case, the service ID is "PRN".

The target checks whether log-in with the physical device of the initiator by SBP-2 has been established (S202). If NO in S202, the target requests the 1394 line control unit 5 to perform IEEE 1394.3 reverse log-in processing (S203). The target confirms whether log-in has been established by reverse log-in (S204). If NO in S204, the target notifies the application of a connection failure, and advances to step S205.

If YES in S202 or S204, the target requests the 1394 line control unit 5 to transmit the connection control request generated in step S201 to the initiator by an IEEE 1394.3 method (S206). The 1394 line control unit 5 waits for a command from the physical device of the initiator (S207). If the 1394 line control unit 5 receives a command from the physical device of the initiator, the target checks whether the command is a connection response (S208).

If YES in S208, the target sends back a response in FIG. 11; if NO, performs processing corresponding to the command (S209). If the command is a connection response, the target determines from the response item whether the result is connection OK or NG (failure) (S210). If the connection is NG, the target notifies the application of a connection failure, and shifts to step S205; if the connection is OK, notifies the application that the service requested by the application can be utilized (S211). The target exchanges data in accordance with an instruction from the application (S212), and executes shutdown processing in accordance with an instruction from the application (S213).

The target checks whether another active queue exists in log-in (S214). If NO in S214, the target requests the 1394 line control unit 5 to perform log-out processing (S215), and ends the processing; if YES, directly ends the processing.

<Operation of Initiator>

Figure 7A:
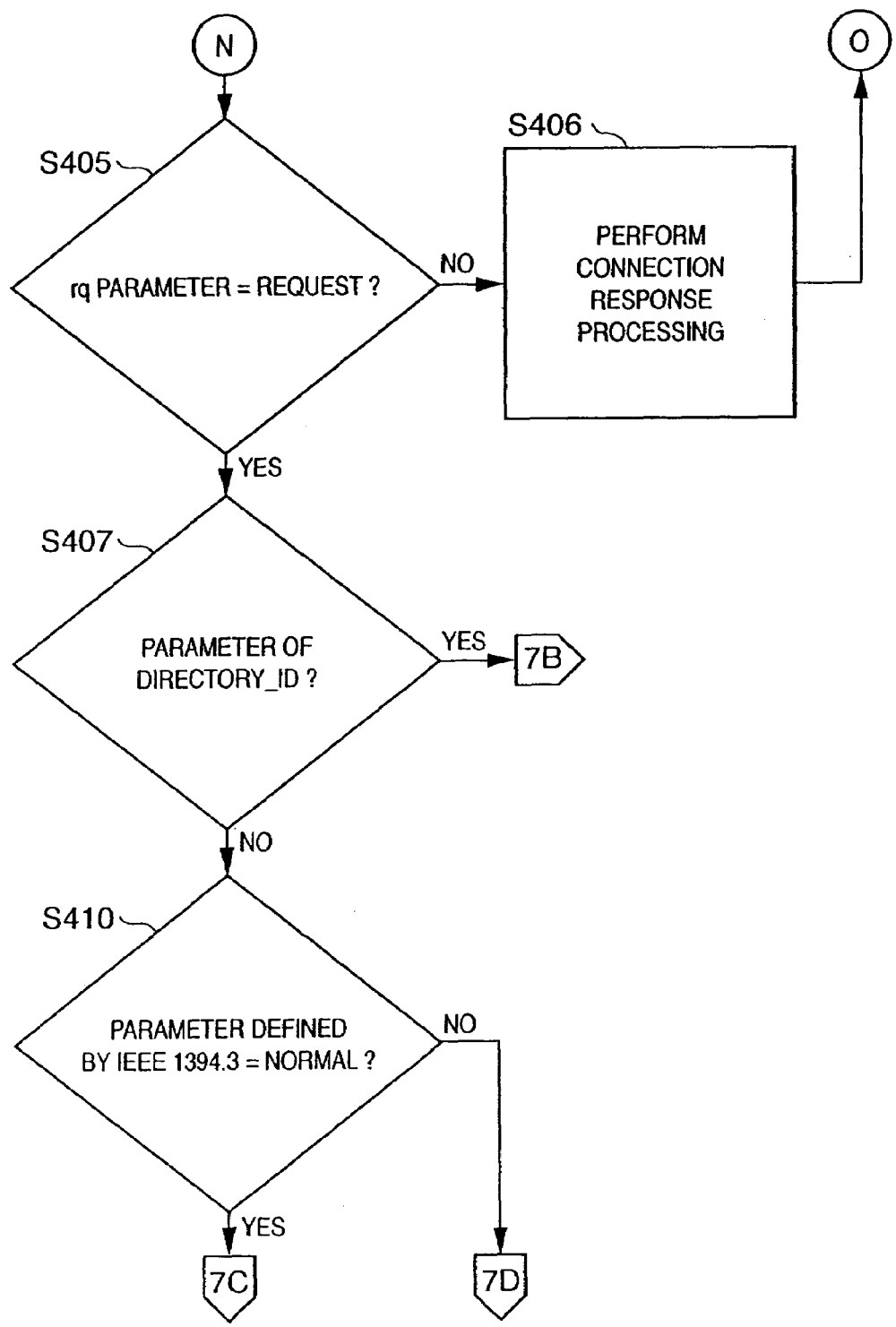
FIG. 7A is a flow chart showing the operation of the initiator to which the present invention is applied.
Figure 7B:
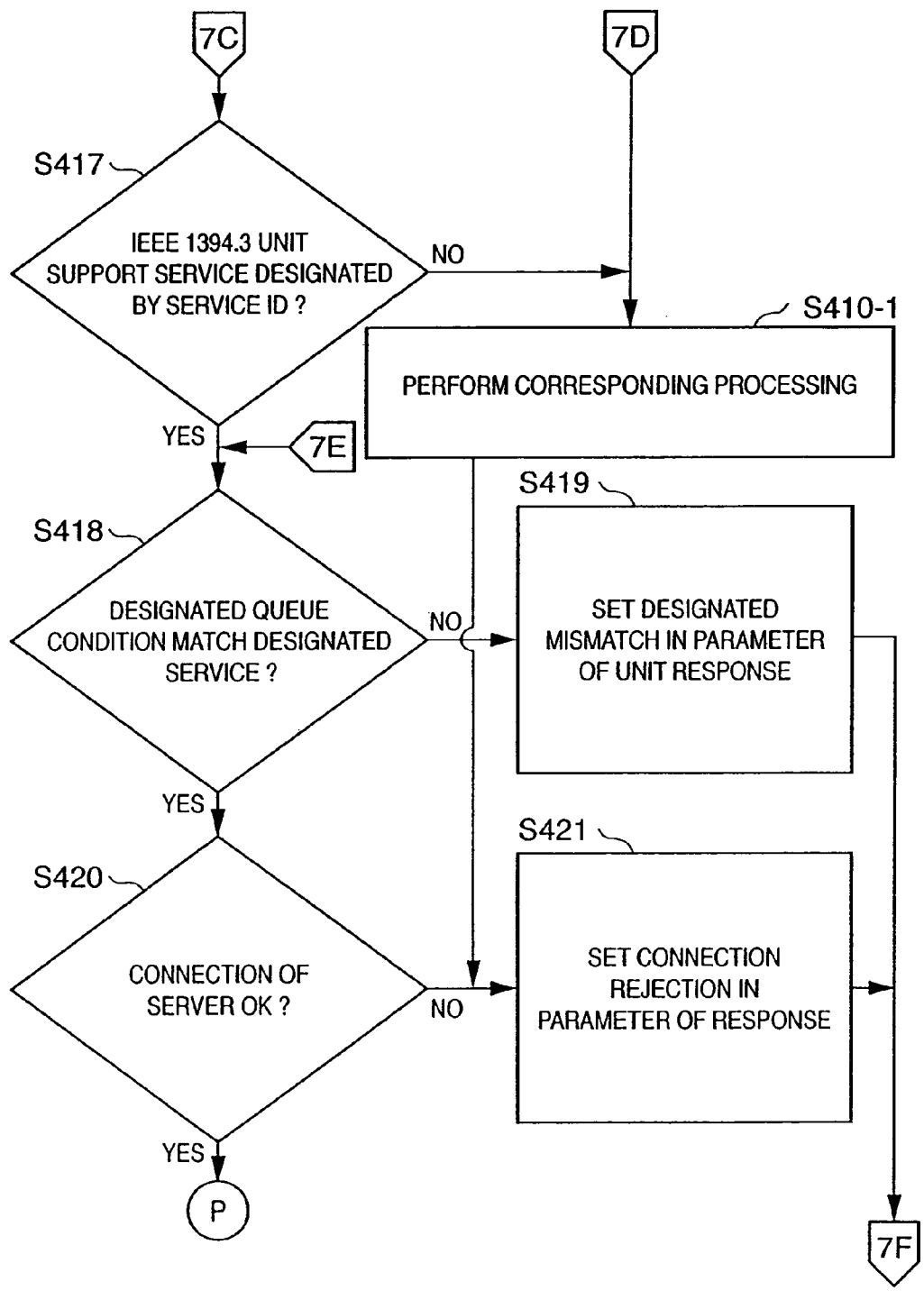
FIG. 7B is a flow chart showing the operation of the initiator to-which the present invention is applied.

The operation of the initiator according to the present invention will be explained with reference to FIGS. 7A to 7C. The initiator is activated and initialized simultaneously when devices including the present invention are initialized. Log-in operation defined by SBP-2 is controlled by the 1394 line control unit 15 and is not described in detail.

The initiator waits until the 1394 line control unit 15 receives data concerning the present invention from a target device (S401). The initiator examines the queue item (defined by IEEE 1394.3) of a corresponding ORB to check whether the received data relates to queue 0 (S402). If NO in S402, the initiator executes processing (defined by IEEE 1394.3) corresponding to the queue number (S403), and advances to S401.

If YES in S402, the initiator checks whether the ctrl_function item (see FIGS. 8 and 9) of control information represents connection (S404). If NO in S404, the initiator performs processing (defined by IEEE 1394.3) corresponding to the designated control function (S405-1), and shifts to S401.

If YES in S404, the initiator checks the Rq item of the control information (S405-2). If the Rq item represents a response, the initiator performs corresponding processing (defined by IEEE 1394.3) (S406), and advances to S401.

If the Rq item of the control information represents a request, the initiator checks whether a DIRECTORY_ID item (see FIGS. 8, 9, and 14) exists in the control information (S407).

If YES in S407, the initiator checks whether the remaining parameters comply with those defined by the IEEE 1394.3 connection control (S408). If NO in S408, the initiator performs corresponding error processing (S409), and shifts to S401.

Figure 12:
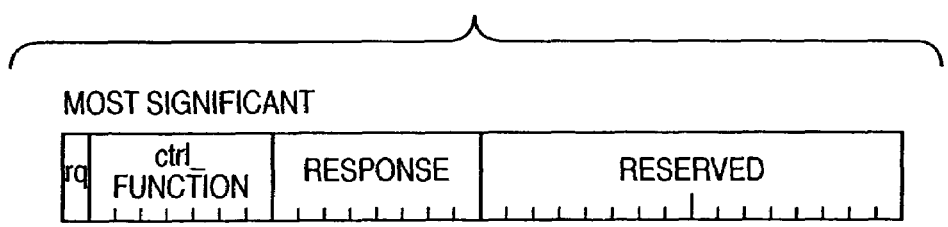
FIG. 12 is a view showing the structure of the connection control function (CONNECT) response extended from the IEEE 1394.3 definition in the present invention when a designated unit directory does not exist.

If YES in S408, the initiator checks whether a unit directory having the same directory ID as the directory ID designated in the DIRECTORY_ID item exists in the initiator (S411). If NO in S411, the initiator checks whether a unit directory having the DIRECTORY_ID value at the start address exists in the initiator (S412). If NO in S412, the initiator sets "the designated unit does not exist." in the parameter of the connection response (see FIGS. 15 and 12) (S413), and shifts to S422.

In step S422, the initiator generates a connection response containing the designated connection response parameter. Then, the initiator requests the 1394 line control unit 15 to transmit the generated connection response (S423), and advances to S429.

If YES in S411 or S412, the initiator checks whether the unit directory designated by DIRECTORY_ID has the contents of the directory as shown in FIG. 17 (S414). If NO in S414, the initiator sets "the designated unit does not exist." in the parameter of the connection response (see FIGS. 15 and 12) (S413), and shifts to S422. FIG. 17 shows the contents of the unit directory according to the present invention. The entries of the specifier ID and version are essential, and the directory ID and the feature directory which defines a providable service are added, as needed.

Figure 13:
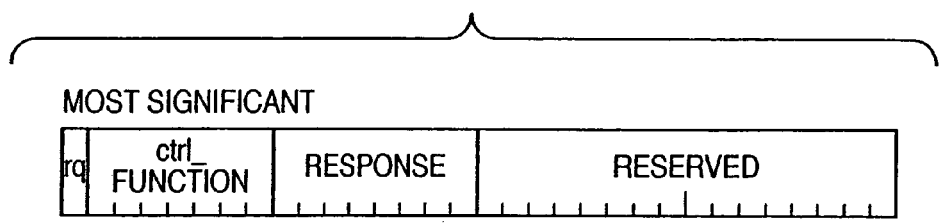
FIG. 13 is a view showing the structure of the connection control function (CONNECT) response extended from the IEEE 1394.3 definition in the present invention when a unit directory designated to provide a designated service does not exist.

If the unit directory designated by DIRECTORY_ID has the contents of the directory described in this embodiment, i.e., entries as shown in FIG. 17 in step S414, the initiator checks whether a service requested by the service ID designated by the connection control is supported by a unit (logical device) corresponding to the unit directory represented by the designated DIRECTORY_ID (S415). If NO in S415, the initiator sets "the designated unit does not support the designated service." in the parameter of the connection response (see FIGS. 15 and 13) (S416), and advances to S422.

If NO in S407, the initiator checks whether the parameters comply with those defined by the IEEE 1394.3 connection control (S410). If NO in S410, the initiator performs corresponding error processing, and shifts to S421; if YES, checks whether the initiator supports a service requested by the service ID designated by the connection control (S417).

Figure 10:
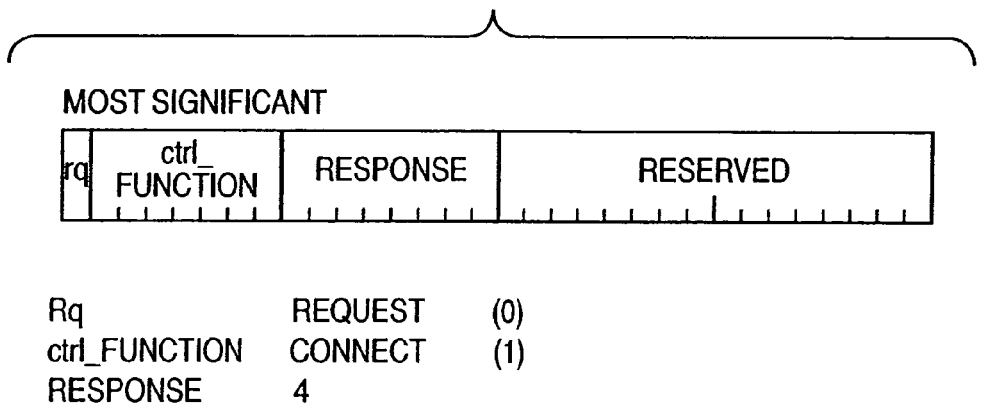
FIG. 10 is a view showing the structure of a connection control function (CONNECT) response defined by IEEE 1394.3 when a service mismatches the type of designated queue.

If YES in S417, the initiator checks whether the contents and number of queues required by the service requested by the service ID designated by the connection control coincide with those designated in the queue field of the connection control (S418). If NO in S418, the initiator sets "mismatch" in the parameter of the connection response (see FIGS. 15 and 10) (S419), and advances to S422.

Figure 19:
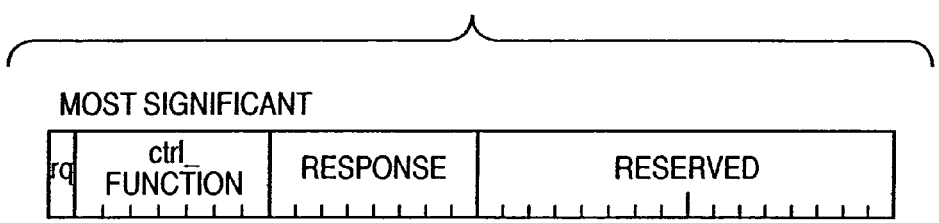
FIG. 19 is a view showing the structure of the connection control function (CONNECT) response defined by IEEE 1394.3 when the connection is rejected.

If YES in S418, the initiator checks whether the service-requested server provides the designated service (S420). If NO in S420, the initiator sets "connection rejection" in the parameter of the connection response (see FIGS. 15 and 19) (S421), and advances to S422.

If YES in S420, the initiator sets "connection OK" in the parameter of the connection response (see FIGS. 15 and 11) (S424), and shifts to S425.

Then, the initiator generates a connection response containing the designated connection response parameter (S425). The initiator requests the 1394 line control unit 15 to transmit the generated connection response (S426). The initiator and target exchange data via the 1394 line control unit 15 by an IEEE 1394.3 method in accordance with a request from a client (S427). After the service ends, the initiator performs shutdown processing by an IEEE 1394.3 method in accordance with a request from the client (S428). Note that the client is an application which requests a service of the initiator via the target. Processes in steps S427 and S428 are executed in correspondence with processes in steps S212 and S213 in FIG. 5B or processes in steps S315 and S316 in FIG. 6B. In step S427, data are exchanged, and the service designated by the target is provided by the initiator. At this time, if a logical device managed by the initiator and a service supported by the logical device are designated, the service designated by the designated logical device is provided.

For example, if the address of the unit directory 303 of logical printer B in FIG. 3B, and "print" which is a service supported by logical printer B are designated by the DEVICE_ID field of a connection control function issued from the target to the initiator, connection is established between the target and the initiator. After that, the initiator provides a buffer to the target, reads data written in the buffer by the target, and executes the service "print" on the basis of the data.

The initiator checks whether an active queue other than queue 0 exists in log-in (S429). If YES in S429, the initiator shifts to S400; if NO, performs log-out processing defined by SBP-2 and ends the processing (S430).

If NO in step S410 or S417, the initiator performs corresponding processing (S410-1), and advances to step S419.

By these procedures, the config ROM in the initiator manages services usable in logical devices for each logical device of the initiator. Connection between the target and the initiator can be established by designating a logical device and service of the initiator by the target. The target can receive the service from the designated logical device.

The above arrangement and procedures allow the target to specify logical devices which provide respective services and to access a desired logical device when a plurality of logical devices exist at one physical node functioning as an initiator, which cannot be supported by IEEE 1394.3, and at least two logical devices provide services having the same service ID. This is very effective for multifunctional devices.

The present invention has been made by paying particular attention to downward compatibility with IEEE 1394.3. If IEEE 1394.3 is installed, the present invention can be realized by a very small number of steps.

SECOND EMBODIMENT

In the first embodiment, unit directories are given directory IDs to discriminate their logical devices.

Figure 18:
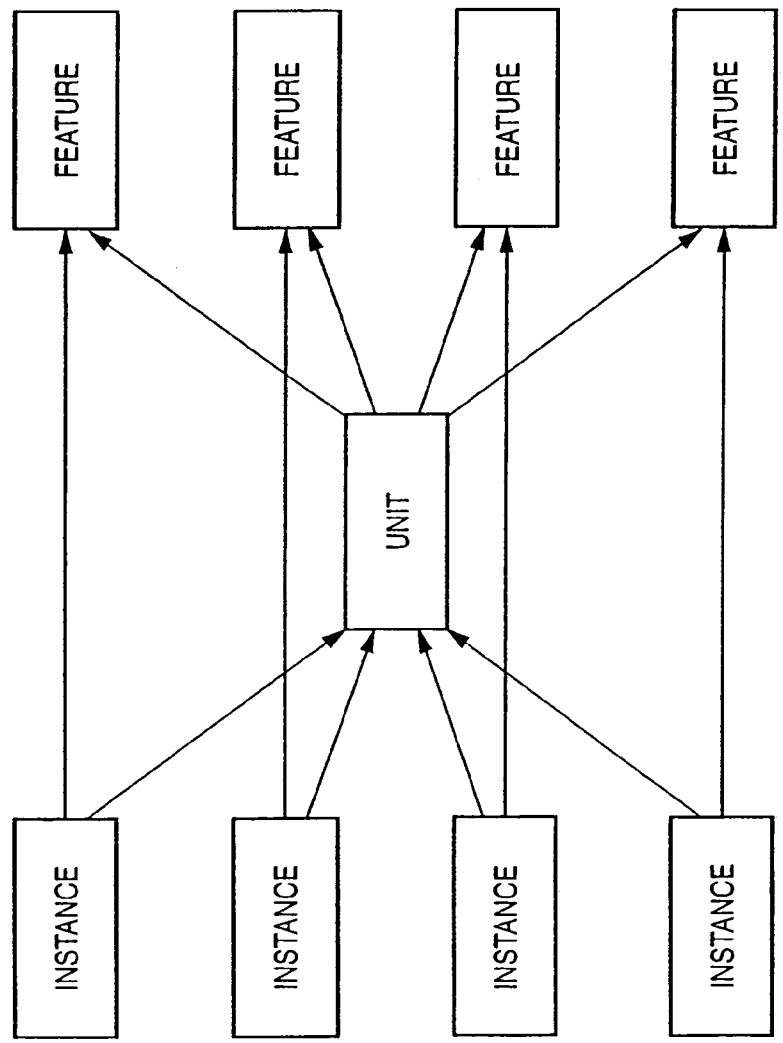
FIG. 18 is a block diagram showing the config ROM of an initiator when the second embodiment of the present invention is applied.

To the contrary, all the instance directories are caused to designate feature directories designated by unit directories, and directory IDs are assigned to the feature directories (see FIG. 18). As the identifiers of logical devices, the directory IDs of the feature directories are set in DIRECTORY_ID which is a parameter of a connection control request in the first embodiment. Also in this case, each logical device can be designated.

THIRD EMBODIMENT

In the second embodiment, feature directories are assigned directory IDs to discriminate their logical devices. In the third embodiment, instance directories are assigned directory IDs. As the identifiers of logical devices, the directory IDs of the instance directories can also be set in DIRECTORY_ID which is a parameter of a connection control request in the first embodiment.

INDUSTRIAL APPLICABILITY

As has been described above, when the initiator has a plurality of logical devices, the initiator can manage the respective logical devices. The target can designate a logical device to establish connection between the target and the initiator.

Even if a plurality of logical devices exist at one physical node functioning as an initiator, which cannot be supported by the conventional IEEE 1394.3, and at least two logical devices provide services represented by the same service ID, the target can specify logical devices which provide respective services, and access a desired logical device. This is very effective for multifunctional devices.

The system, apparatus, or method of the present invention has been made by paying particular attention to downward compatibility with IEEE 1394.3. If IEEE 1394.3 is installed, the present invention can be realized by a very small number of steps.

The invention claimed is:

1. A communication system having a plurality of electronic devices, comprising:
   an initiator device functioning as an initiator defined by IEEE 1394.3, wherein the initiator device comprises:
   a first unit directory having a version value defined by IEEE 1394.3 and a remaining value defined by IEEE 1394.3; and
   a second unit directory having a version value different from a value defined by IEEE 1394.3 and a remaining value defined by IEEE 1394.3; and
   a target device which functions as a target defined by IEEE 1394.3, wherein the target device comprises:
   a reader that reads at least one of the first unit directory and the second unit directory of the initiator device in order to recognize a service provided by the initiator device; and
   an analyzer that, when said reader reads any of the first unit directory and the second unit directory, analyzes the remaining value in accordance with an IEEE 1394.3 definition.

2. The communication system according to claim 1, wherein the target device further determines whether a version value of the read unit directory is 0 or 1.

3. The communication system according to claim 2, wherein the target device determines whether the read unit directory contains an entry of a directory ID, and when the unit directory contains the entry of the directory ID, extracts a value of the directory ID.

4. The communication system according to claim 3, wherein, when the read unit directory contains the entry of the directory ID the target device adds a value of the directory ID as a connection parameter defined by IEEE 1394.3.

5. The communication system according to claim 3, wherein, when the read unit directory does not contain the entry of the directory ID the target device adds an address of the read unit directory as a connection parameter defined by IEEE 1394.3.

6. The communication system according to claim 3, wherein, the initiator device has a function of determining presence/absence of an added parameter upon reception of a connection parameter defined by IEEE 1394.3 from the target device.

7. The communication system according to claim 6, wherein, when the added parameter exists, the initiator device confirms whether a unit directory designated by the parameter exists, and when the unit directory exists, the initiator device confirms whether a content of the unit directory complies with IEEE 1394.3 except the version of the unit directory.

8. The communication system according to claim 7, wherein, the initiator device sends back a connection rejection to the target device when a unit directory designated by the parameter does not exist or the content of the unit directory does not comply with IEEE 1394.3.

9. The communication system according to claim 7, wherein, the initiator device further comprises a function of, when a unit directory designated by the parameter exists, and the content of the unit directory complies with a unit directory defined by IEEE 1394.3 except the version of the unit directory, determining whether a service ID designated by the parameter is supported by the unit directory designated by the parameter.

10. The communication system according to claim 9, wherein, the initiator sends back connection rejection to the target device when a unit directory designated by the parameter exists, the content of the unit directory complies with IEEE 1394.3 except the version of the unit directory, and a service ID designated by the parameter is not supported by the unit directory designated by the parameter.

11. The communication system according to claim 9, wherein, the initiator sends back a connection permission to the target device when a unit directory designated by the parameter exists, the content of the unit directory complies with IEEE 1394.3 except the version of the unit directory, and the service ID designated by the parameter is supported by the unit directory designated by the parameter.

* * * * *

UNITED STATES PATENT AND TRADEMARK OFFICE
CERTIFICATE OF CORRECTION

| | | |
|---|---|---|
| PATENT NO. | : 7,073,000 B2 | Page 1 of 1 |
| APPLICATION NO. | : 10/185701 | |
| DATED | : July 4, 2006 | |
| INVENTOR(S) | : Isoda | |

It is certified that error appears in the above-identified patent and that said Letters Patent is hereby corrected as shown below:

COLUMN 1:
Line 20, "tuted" should read -- tute --.

COLUMN 3:
Line 37, "comprises" should read -- comprises: --;
Line 60, "comprise" should read -- comprises --; and
Line 64, "means" should read -- means to --.

COLUMN 4:
Line 4, "means" should read -- means to --;
Line 10, "comprises" should read -- comprises: --; and
Line 28, "comprise" should read -- comprises --.

COLUMN 5:
Line 2, "to-which" should read -- to which --.

COLUMN 7:
Lines 28-30,   "Initiator unit directory 3 contains an item DIRECTORY_ID (directory ID) in addition to the features of initiator unit directory 2." should be deleted.

Signed and Sealed this

Eighteenth Day of March, 2008

JON W. DUDAS
*Director of the United States Patent and Trademark Office*